Aug. 30, 1955  J. V. WECKBAUGH  2,716,553
TYPOGRAPHICAL COMPOSING, PRINTING AND DISTRIBUTING MACHINE
Filed June 19, 1951  16 Sheets-Sheet 1

Aug. 30, 1955  J. V. WECKBAUGH  2,716,553
TYPOGRAPHICAL COMPOSING, PRINTING AND DISTRIBUTING MACHINE
Filed June 19, 1951  16 Sheets-Sheet 7
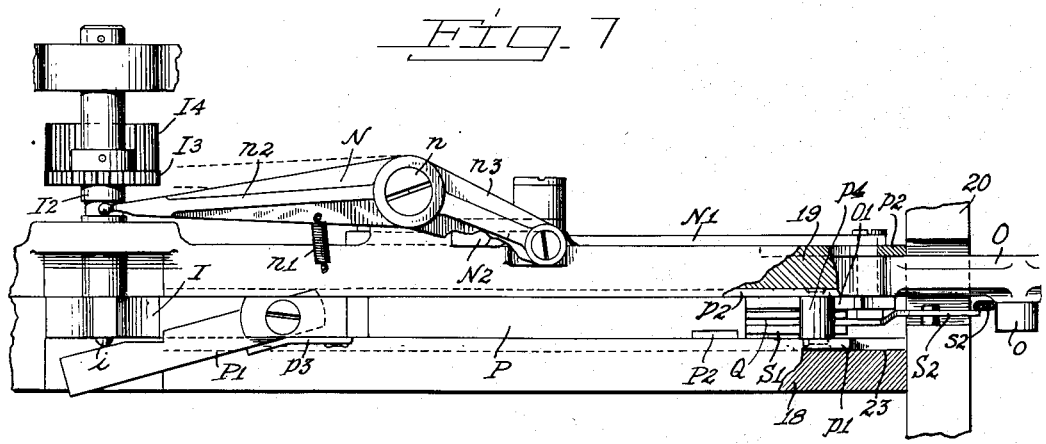
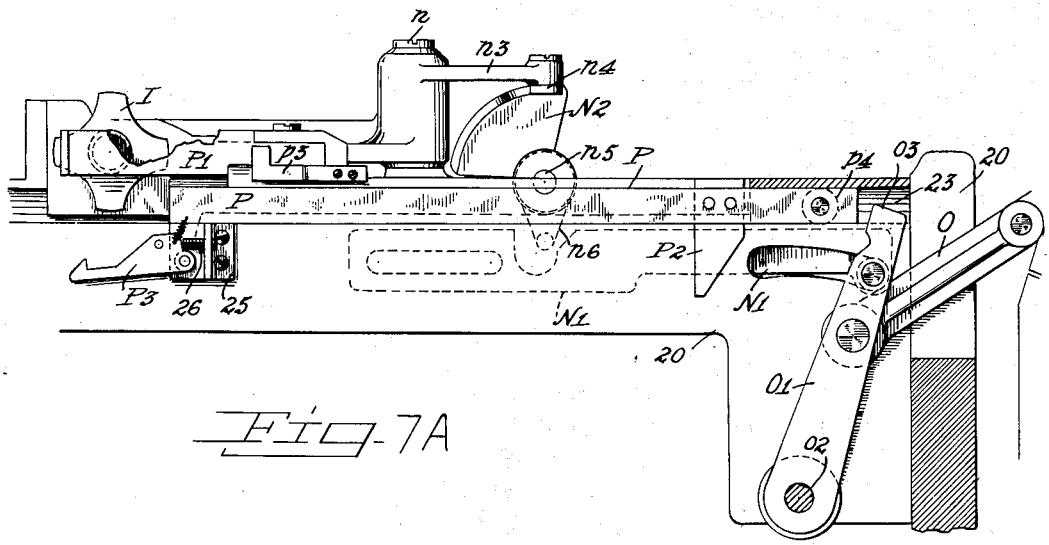
INVENTOR.

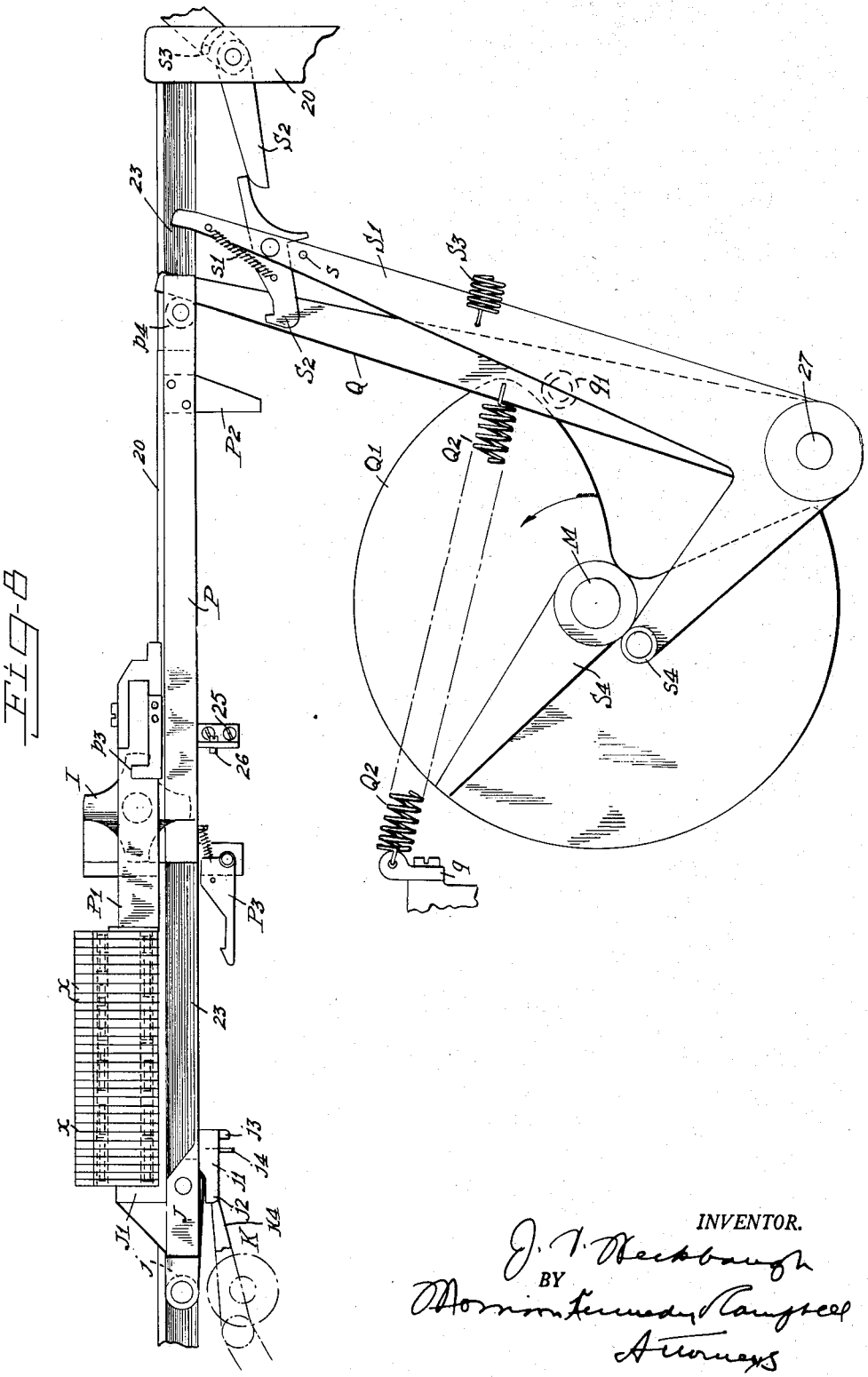

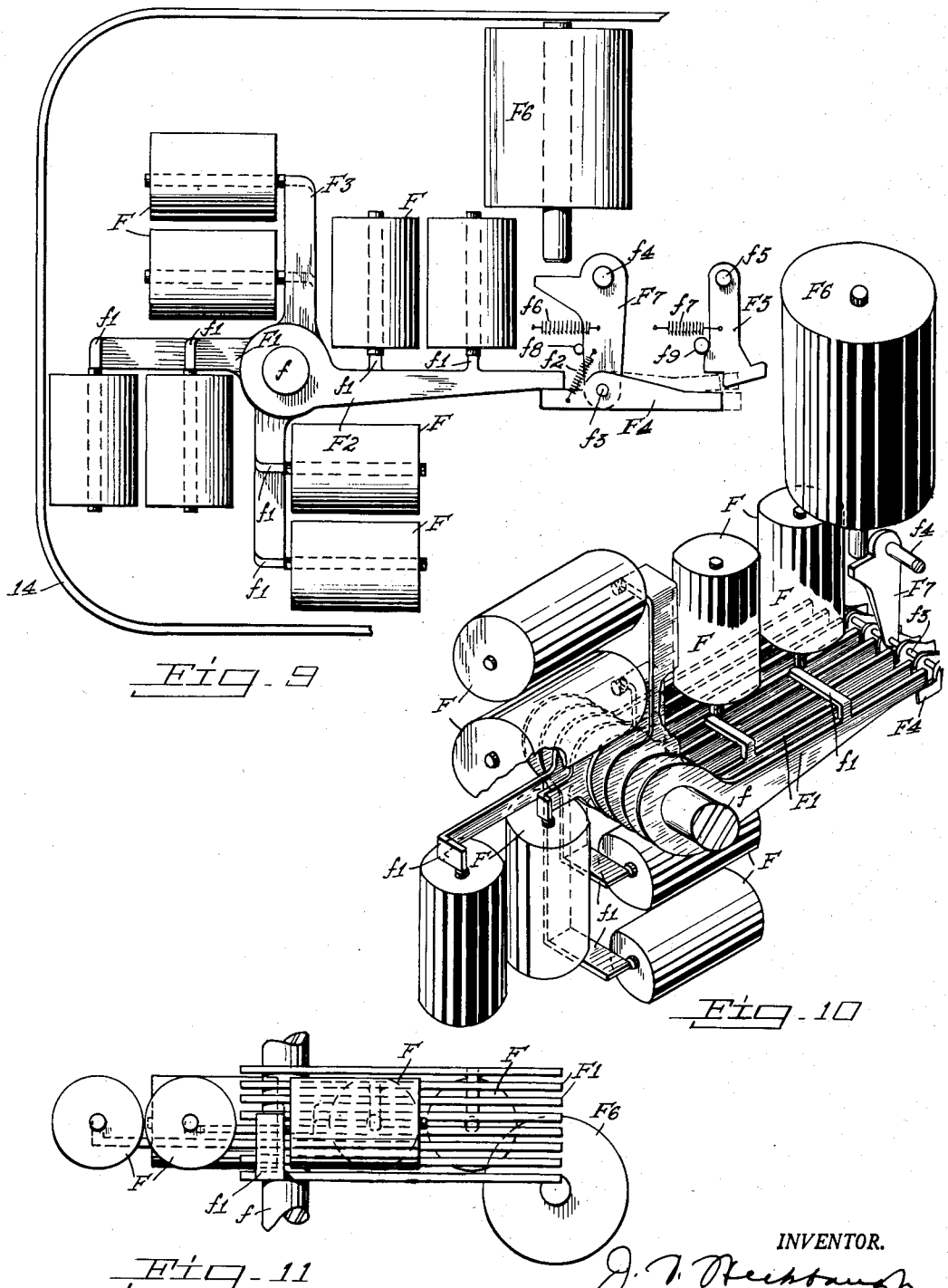

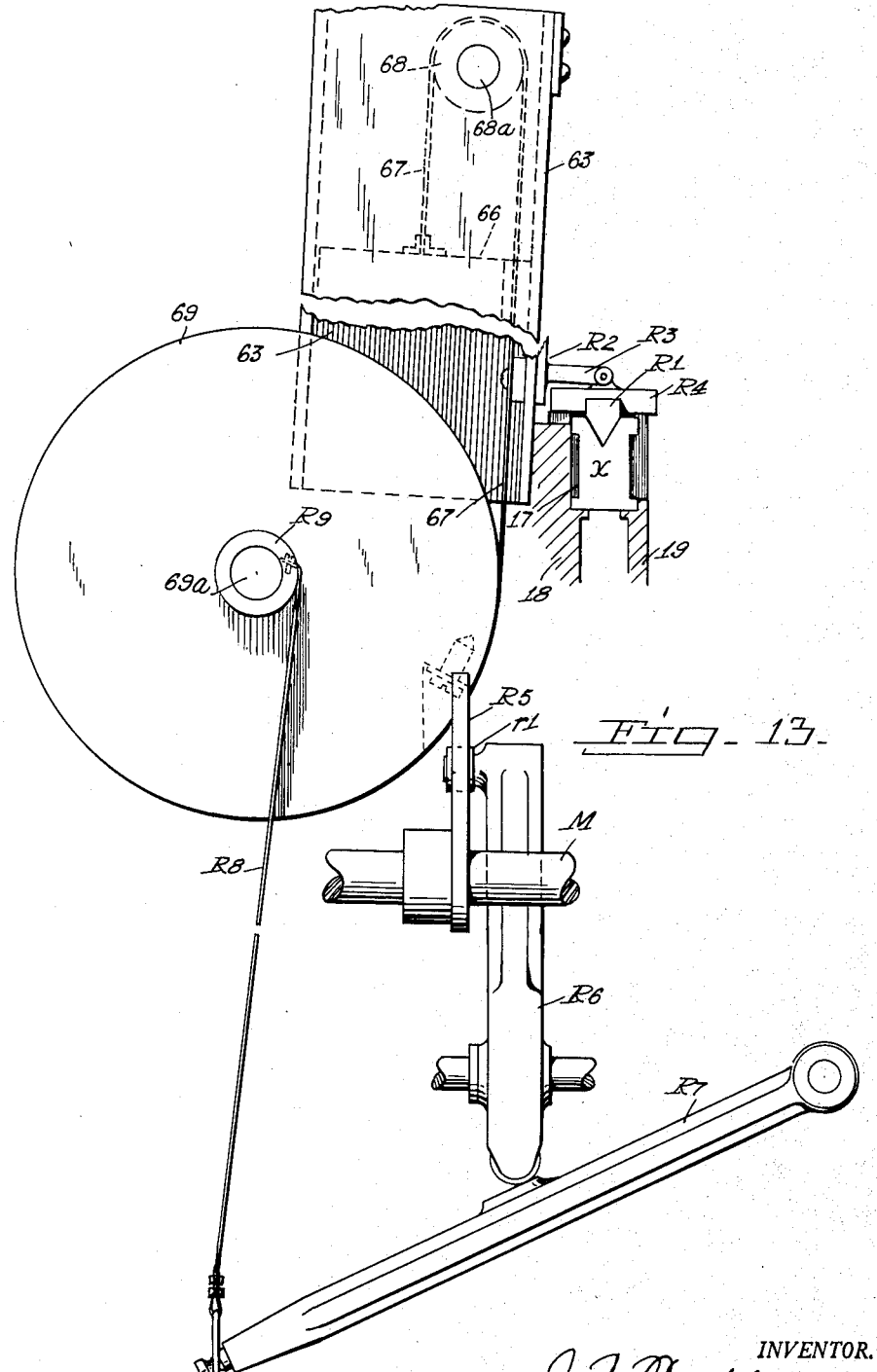

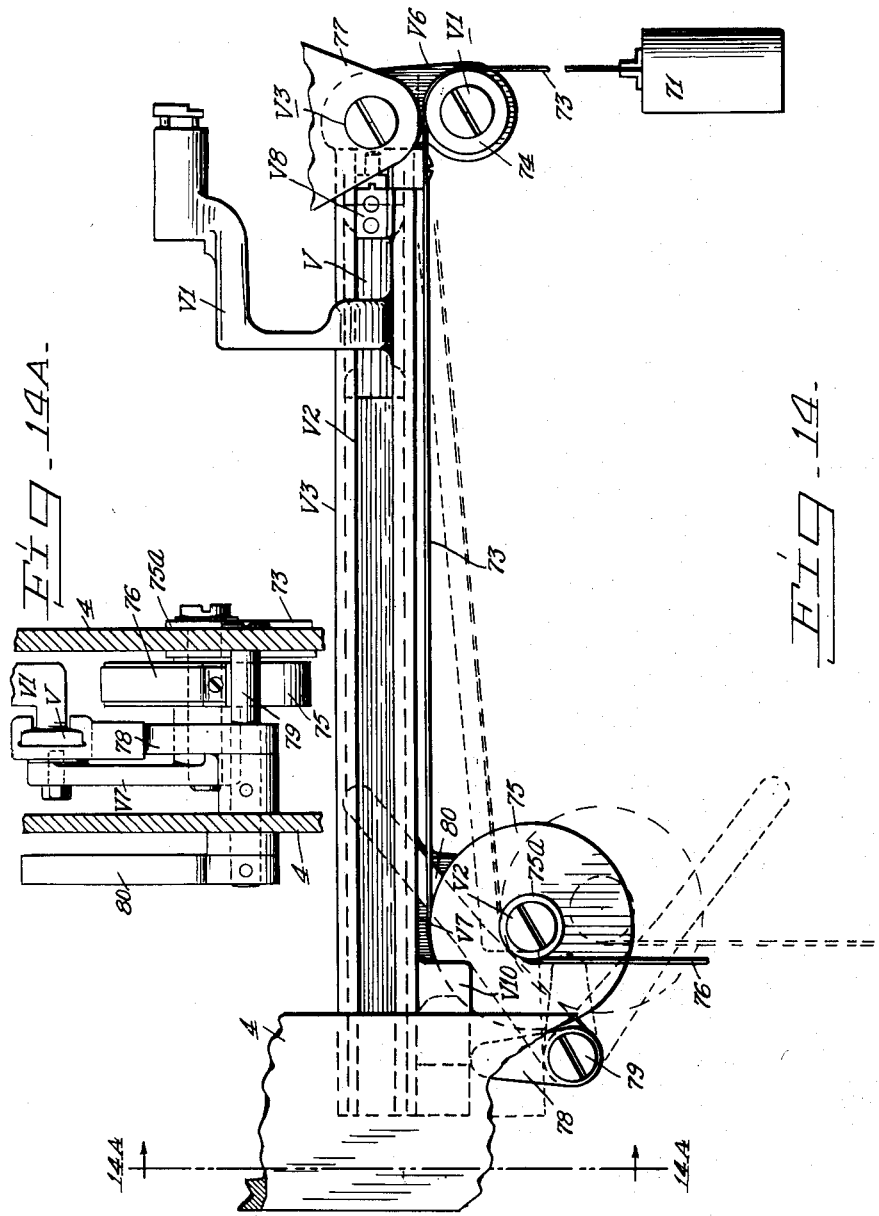

Aug. 30, 1955  J. V. WECKBAUGH  2,716,553
TYPOGRAPHICAL COMPOSING, PRINTING AND DISTRIBUTING MACHINE
Filed June 19, 1951  16 Sheets-Sheet 13
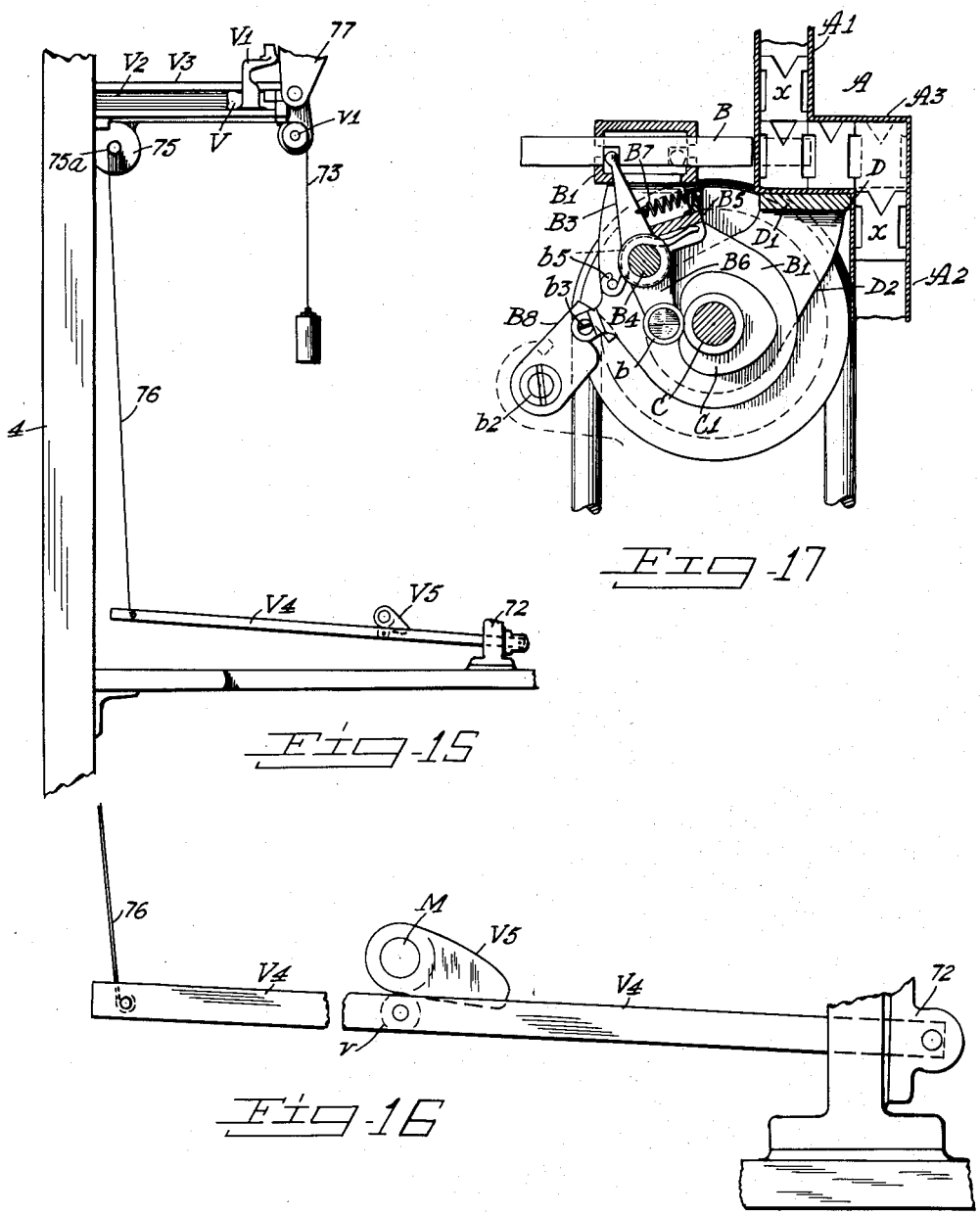
INVENTOR.

Aug. 30, 1955  J. V. WECKBAUGH  2,716,553
TYPOGRAPHICAL COMPOSING, PRINTING AND DISTRIBUTING MACHINE
Filed June 19, 1951  16 Sheets-Sheet 14
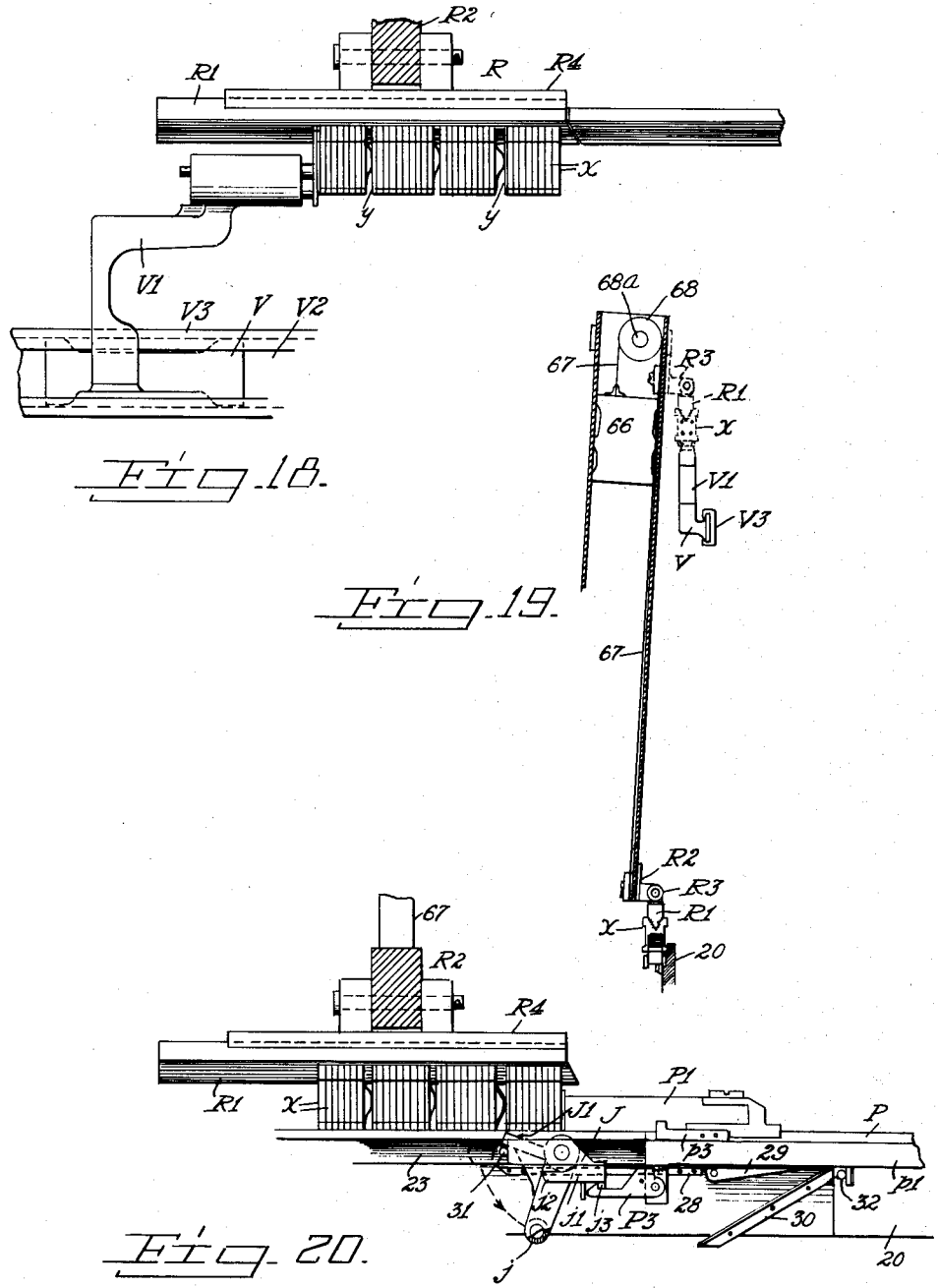
INVENTOR.
J. V. Weckbaugh
BY Aug. 30, 1955　　　J. V. WECKBAUGH　　　2,716,553
TYPOGRAPHICAL COMPOSING, PRINTING AND DISTRIBUTING MACHINE
Filed June 19, 1951　　　　　　　　　　　　16 Sheets-Sheet 15
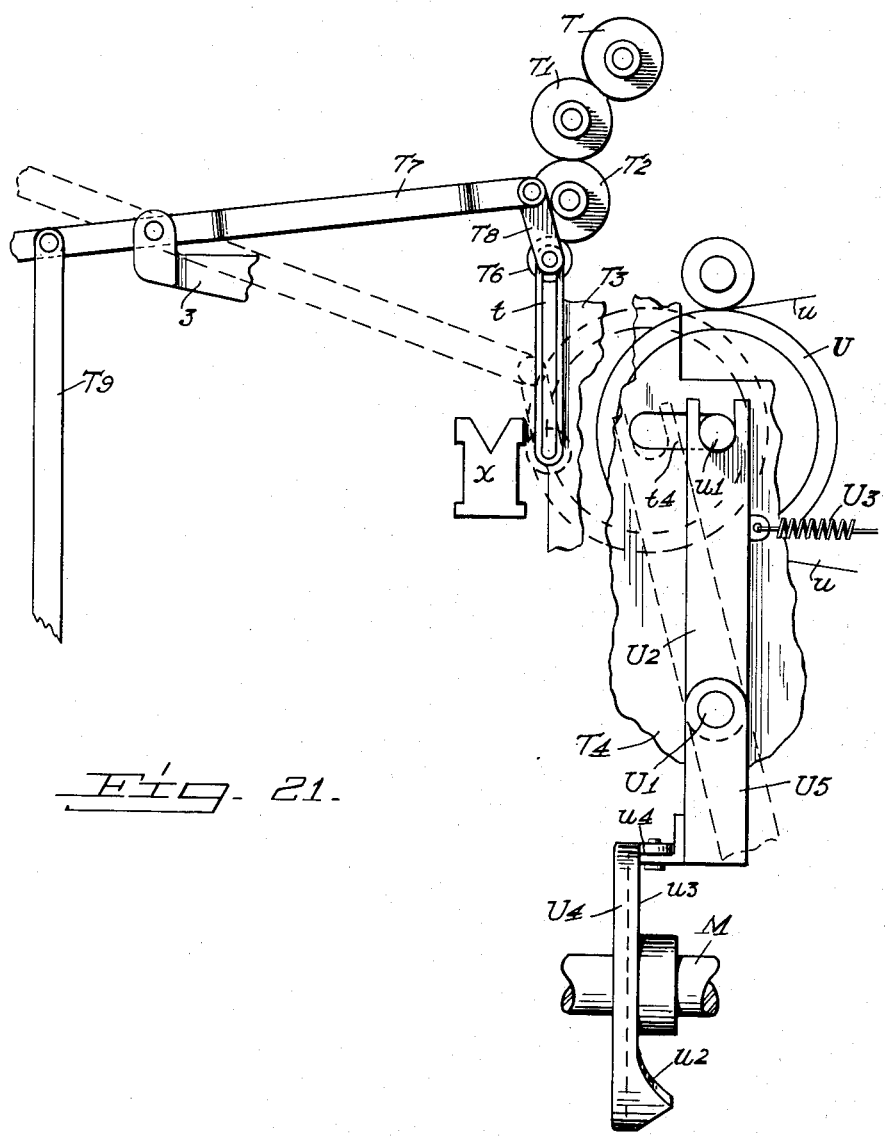
INVENTOR.

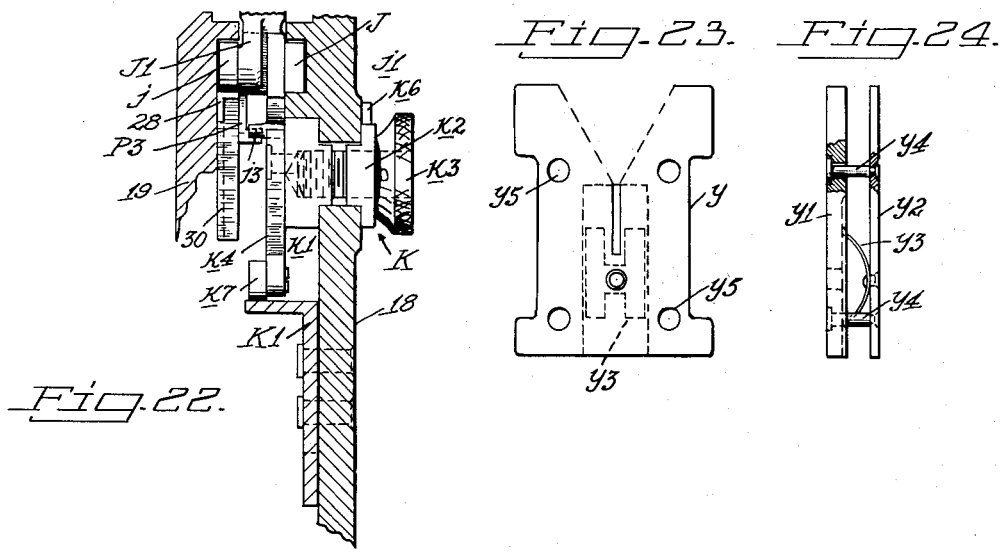
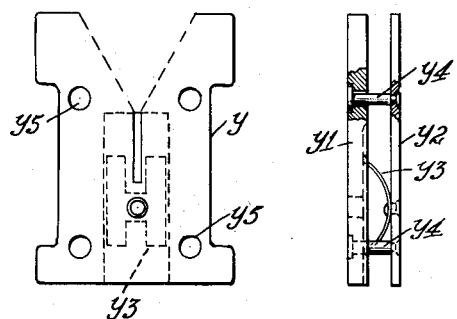
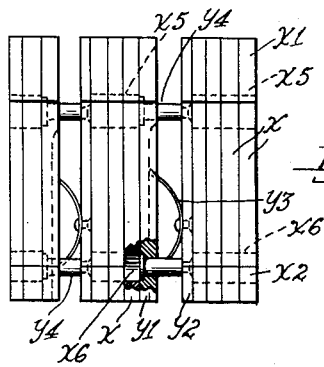
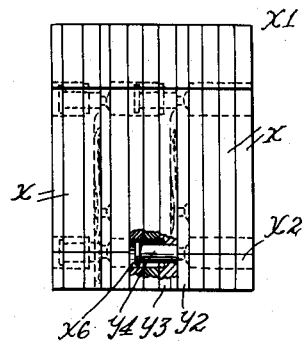
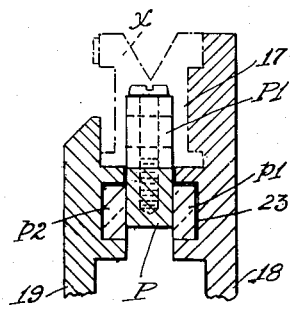

United States Patent Office 2,716,553
Patented Aug. 30, 1955

2,716,553

TYPOGRAPHICAL COMPOSING, PRINTING AND DISTRIBUTING MACHINE

Joseph V. Weckbaugh, Greenwich, Conn., assignor to Mergenthaler Linotype Company, a corporation of New York Application June 19, 1951, Serial No. 232,338

31 Claims. (Cl. 276—2)

This invention is directed to an improved patrix composing, printing and distributing machine wherein the patrices are released according to character from a storage magazine by the manipulation of a keyboard, and then assembled in line together with spacers, the composed line during a machine cycle, being justified and inked preparatory to the printing operation, and thereafter shifted horizontally endwise into engagement with an elevator bar which carries the line upwardly to a higher level where the patrices together with the spacers are transferred therefrom and returned through the distributing mechanism to their appropriate magazine channels.

Like the regular Linotype matrices, the patrices vary in thickness according to character and are formed with the usual V-shaped tooth combination notch as well as with upper and lower projecting ears whereby they are sustained in upright position as they circulate through the machine. However in the present embodiment, the characters of the patrices employed instead of being produced on the body portions thereof, preferably are formed on the rear edges of their upper projecting ears, and the spacers unlike the usual expansible spacebands used in the commercial Linotype machines, comprise two opposing members which conform exactly in size and shape with that of the patrices and normally are held yieldingly spaced a definite distance apart by an intervening flat spring so that by subjecting a composed line to endwise clamping pressure, the spacers will be collapsed against the tension of their springs, and as a result effect proper justification of the line.

Upon being released from their magazine, the patrices and spacers are directed downwardly and into an elongated horizontally disposed receiving channel where they are composed in line under the influence of a constantly rotating star wheel, and against an upstanding finger of a yielding slide member which is mounted in suitable horizontal guide-ways located directly below the receiving channel. When a patrix line is completely composed, a conveniently arranged hand lever is operated and through appropriate connections later to be described, is adapted according to the present invention, first to move the star wheel axially rearward beyond the transfer channel so as to permit the leading end portion of a pusher bar to swing into a position directly behind the last patrix to enter the composed line. Then, by further operation of the hand lever, the patrix line is advanced by the pusher bar to the inking position where it is positively arrested by an adjustable stop device and properly justified in the manner above stated. At the same time and as the operation of the hand lever is completed, a switch is actuated thereby, to close an electrical circuit that under normal conditions, will cause the engagement of the main driving clutch and thus inaugurate the machine cycle of operation. If however, the length of a composed line should be greater than that required (as determined by the setting of the stop device) the circuit to the main clutch will be broken before the cycle can be inaugurated, by the actuation of a second switch included in the same circuit and which is controlled by the initial movement of the hand lever.

It is also proposed according to the present invention to avoid the possibility of reproducing a composed line that may be too short for proper justification, and to this end the machine is equipped with a pair of light signals, one red and the other green arranged in separate circuits and which are capable of being illuminated successively in a manner later to be pointed out. as a composed line during its advance by the pusher bar, approaches the stop device. Suffice it to say, that if a composed line is too short to justify, the red signal only will be illuminated to warn the operator of the discrepancy, and thus permit him to stop the operation of the machine until the trouble has been rectified. Other short lines such as those occurring at the end of a column or paragraph, are quadded out at the time of assemblage to bring them to the selected length. When such lines as well as those that require no quadding are sent into the machine, the green signal is illuminated and will remain so during justification, and the inking and printing operations that follow.

Thereafter, the yielding slide member already mentioned, is automatically disengaged from the adjustable stop device, and the patrix line in an unjustified condition, is further advanced by the pusher bar (this time under spring tension and cam control), into engagement with a ribbed elevator bar which immediately ascends to carry the line to the distributing level. Meanwhile however, several operations will have taken place in the following predetermined order of succession; first, the hand controlled starting lever is restored to its normal or inoperative position; second, the upstanding finger of the slide member is rocked downwardly out of the way by the leading patrix of the line as the latter is pushed into the elevator bar; third, a pawl attached to the pusher bar is rocked into engaging relation with the slide member while another pawl carried by a cam actuated lever, is caused to engage a depending projection located near the following end of the pusher bar; and fourth, the slide member, the upstanding finger thereof as well as the pusher bar, are all restored to their original positions and ready to function while the next patrix line is being composed. As the machine cycle is completed and just before the elevator arrives at the distributing level, a horizontal, weight actuated slide first is retracted and then released in time to shift the patrices and spacers from the elevator bar into a position from which they are fed one after another to the distributor screws for final distribution into their proper magazine channels.

The magazine or magazines employed are supported in a vertical position in the machine, so as to minimize wear or injury to the patrix characters that might otherwise take place; and to break the fall of the patrices from the distributor bar to the escapements which are located as usual near the lower end of the magazine, the latter comprises an upper and a lower section disposed in offset relation to each other, and a third intermediate horizontal section which communicates with both the upper and the lower sections. The arrangement is such that patrices released by the distributor bar will enter the upper magazine section but may drop therethrough only as far as the horizontal section of the magazine where they are pushed edgewise forwardly into a position from which they may pass downwardly through the lower magazine section to their releasing position. Cam controlled means operating in synchronism with the distributing mechanism, is employed to effect such forward movement of the patrices.

The release of the patrices according to character, from the magazine, is accomplished electrically by devices controlled from the keyboard, and to carry out the invention, these devices include generally, patrix selecting solenoids arranged in pairs alongside the lower end of the magazine at the front, and divided into groups of eight, one solenoid for each of a corresponding number of adjacent magazine channels. The solenoids control directly the operation of a series of levers mounted on a common horizontal pivot rod, and the different pairs of solenoids in each group are disposed in the same vertical plane, two pairs above and two pairs below said rod, so that the solenoids in all groups (probably twelve), may readily be accommodated in a space determined by the width of the magazine at its discharge end. Levers are formed with offset projecting arms located in engaging relation to the cores of their respective solenoids, and also are formed with longer fore and aft arms having their free ends normally engaged with a like number of similarly disposed rocking levers, the latter being divided into sets of eight which are capable of endwise movement rearwardly against spring tension, in order that they may actuate through the medium of another series of vertically disposed thrust elements, any selected one of the patrix releasing pawls of the magazine. In other words, when a solenoid in any group is charged by the depression of a finger key, the fore and aft arm of the lever it controls, will be forced downwardly to raise the rear end of the corresponding rocking lever into a position where it may engage and actuate the proper thrust element as the set in which the rocking lever happens to be located, is moved or pushed rearwardly. The endwise movement of each set of the rocking levers is effected by a separate and somewhat larger solenoid, arranged in the same circuits with those in the different groups already mentioned, and adapted when energized, to operate a bellcrank lever which latter is connected to the pivot rod of the associated set of rocking levers and serves also to support them in their normal position.

The keyboard is equipped with the ordinary tiltable, mercury switches connected to the respective finger keys as well as to the spacer key, the terminal wires of all of said switches leading to a common bus bar and thence through an automatically controlled circuit breaker to the different solenoids. The circuit breaker serves as a safety element and is intended to regulate the actuation of the patrix releasing escapement pawls so as to prevent the release of a column of patrices (instead of one at a time as required) if a finger key should happen to be held depressed too long. The foregoing and other features of the improved machine will be more fully understood from the detailed description to follow.

In the accompanying drawings the invention has been shown merely in preferred form by way of example and it should be understood therefore that the invention is not limited to any particular form or embodiment except insofar as such limitations are specified in the appended claims.

Referring to the drawings—

Fig. 3A is a vertical section taken on the line 3A—3A of Fig. 3.

Fig. 4A is a detail vertical section showing the escapement pawl and its actuating plunger.

Fig. 7 is a top plan view showing the star wheel retracting device, and partly broken away to show more clearly the mounting of the pusher bar and the hand controlled means for operating said bar as well as the retracting device.

Fig. 7A is a front elevation of the parts shown in Fig. 7, the front side wall of the supporting bracket therefor being omitted in order that the pusher bar and its operating means, may be shown in full lines.

Fig. 8 is a front elevation showing a patrix line advanced and justified by the pusher bar in the printing position, and showing also the cam controlled means for completing the active stroke of said bar, as well as the cam actuated spring controlled means for effecting the return stroke of the pusher bar.

Fig. 9 is a side elevation of one group of solenoids and the set of connections controlled thereby to effect the release of the patrices from a corresponding group of magazine channels.

Fig. 10 is a perspective view of the parts shown in Fig. 9.

Fig. 11 is a bottom plan view of the parts shown in Figs. 9 and 10.

Fig. 13 is a side elevation partly in section showing the elevator seated in its patrix line receiving position, upon the side walls of the horizontal supporting bracket, and showing also the cam actuated weight controlled levers for operating the elevator.

Fig. 14 is a front elevation showing on an enlarged scale, the distributor shifter slide bar and parts immediately associated therewith.

Fig. 14A is a vertical section taken on the lines 14A—14A of Fig. 14.

Fig. 15 is a front elevation showing on a relatively small scale the cam actuated, weight controlled lever and strap connections for operating the distributor shifter slide.

Fig. 16 is a fragmentary detail of the weight controlled lever shown in Fig. 15, and the cam for actuating it.

Fig. 17 is a vertical section showing the means for supporting the magazine in its normal position, and the means employed for shifting the patrices horizontally from one of the vertical magazine sections to the other.

Fig. 18 is a detail showing the shifter slide finger about to transfer a composed patrix line suspended from the ribbed elevator bar onto a similar bar leading to the distributing mechanism.

Fig. 19 is a detail on a relatively small scale and showing the position of the weight in the guide post when the elevator is located in its lower or line receiving position, and indicating in dotted lines the elevator in its upper position with the patrix line in engaging relation to the finger of the distributor shifter slide.

Fig. 20 is a front elevation showing the position certain parts are caused to assume as the pusher bar completes its active stroke to advance a patrix line into engagement with the elevator bar.

Fig. 21 is an end elevation showing certain parts of the inking and printing mechanisms in their normal position, and indicating in dotted lines the positions they will occupy during the inking and printing operations.

Figure 5:
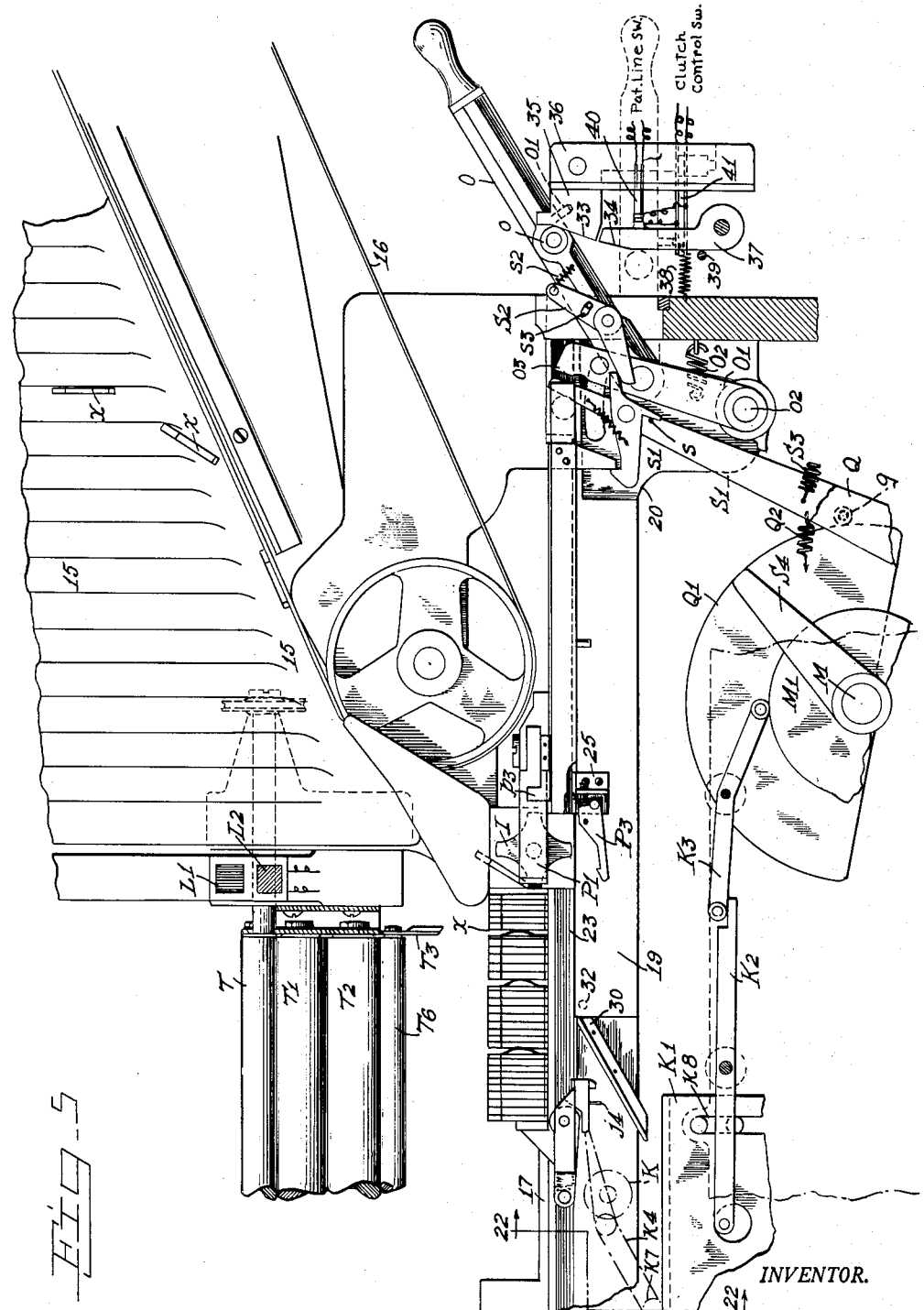
Fig. 5 is a front elevation partly in section and broken away, of the patrix assembling, line advancing and control mechanisms.

Fig. 22 is a vertical section taken on the line 22—22 of Fig. 5 but showing also the adjustable stop device for sustaining the slide block and line resistant finger in proper position during the justifying, inking and printing operations.

Fig. 23 is a detail face view on an enlarged scale, of a line justifying spacer.

Fig. 24 is an edge view partly in section, of the spacer shown in Fig. 23.

Fig. 25 is a front elevation partly broken away, of a composed line of patrices and spacers before it is justified.

Fig. 26 is a similar view of the composed line shown in Fig. 25, after it has been justified; and Fig. 27 is a detail vertical section through the front and rear side walls of the elongated supporting bracket for the pusher bar, showing the patrix receiving channel and the guide-ways for said bar.

Figure 1:
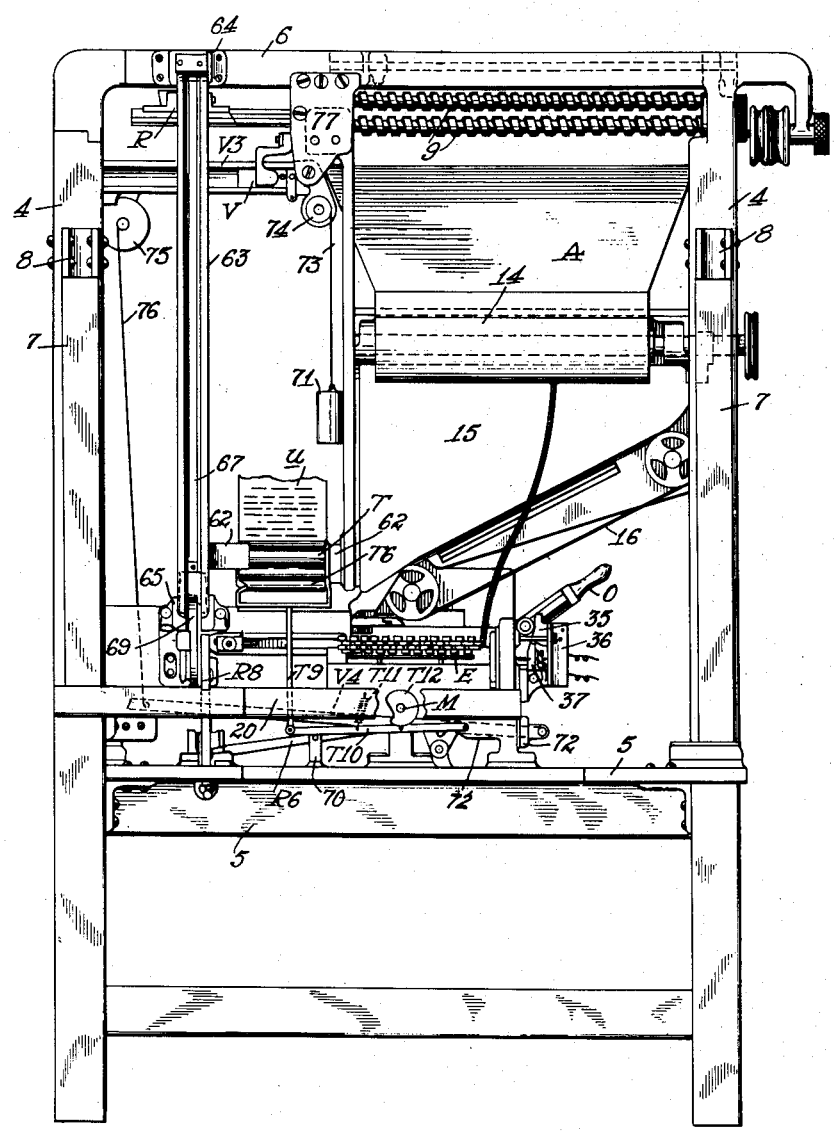
Fig. 1 is a front elevation of the improved patrix composing and printing machine.
Figure 2:
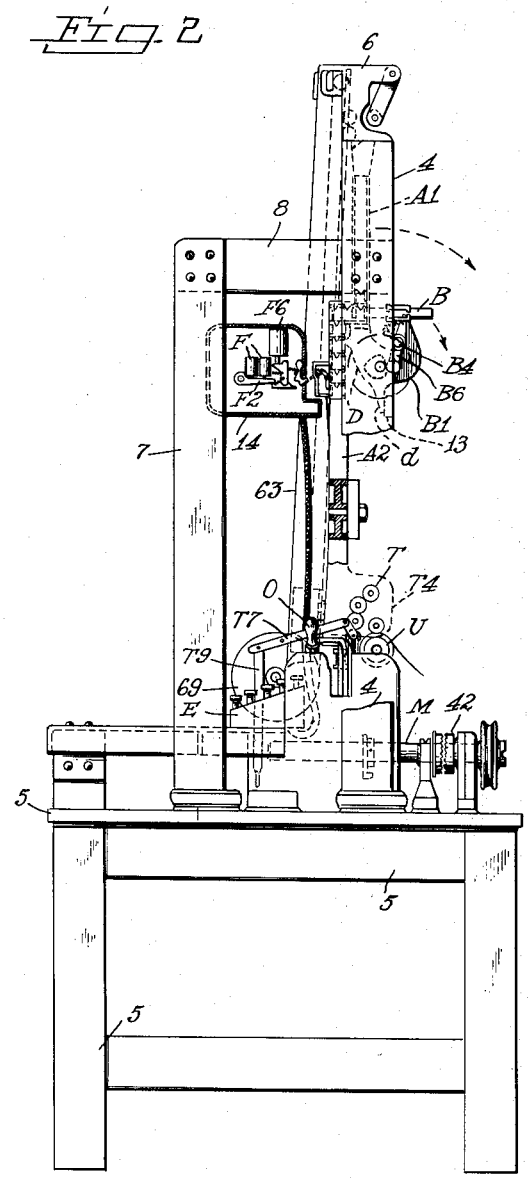
Fig. 2 is an end elevation partly in section and broken away, of the machine shown in Fig. 1.

The patrices $x$ and spacers $y$ are stored in a channeled magazine A mounted in the machine frame, the latter as best shown in Figs. 1 and 2, comprising generally, a pair of main upright side members 4 rising from a rectangular base 5, a horizontal cross beam 6 secured to the upper ends of said members for supporting the distributing mechanism, and a second pair of shorter upright side members 7 also rising from the base 5 and connected respectively at the top by intermediate fore and aft tie beams 8 to the main side members 4. The distributing mechanism, like that employed in commercial Linotype machines, consists in part of an elongated ribbed bar, a set of constantly rotating screws 9 (Fig. 1) for advancing the patrices along the bar, and a channeled magazine entrance 10 associated with the distributing mechanism, for directing the patrices as they are released by the bar, into their proper magazine channels.

As previously stated the patrices $x$ vary in thickness according to character and are formed with upper and lower projecting ears $x1$ and $x2$ as well as with the usual V-shaped tooth combination notch $x3$. According to the present invention however, the thickness of the projecting ears of the patrices $x$ is the same as their body portions, and the characters $x4$ thereof are formed on their upper rear projecting ears instead of on their rear edges in order that they may be readily inked and a printed copy obtained therefrom during a machine cycle of operation. Also, the character bearing projecting ears of the patrices may be varied in length if desired, to accommodate different faces or styles of type, without interfering with the circulation of the patrices through the present machine. The spacers $y$ (Figs. 23 and 24) comprise two opposing side members $y1$ and $y2$ similar in shape and size to that of the patrices, and a flat H-shaped spring element $y3$ interposed between said members and attached by a single rivet to the member $y2$. The spacers $y$ also include two upper and two lower aligning pins $y4$ projecting laterally from the member $y2$ through corresponding apertures $y5$ in the member $y1$, and formed with head portions which are held normally seated in shallow counterbores of the apertures under the tension of the spring $y3$. The assembly is such that the two opposing members of the spacers are held yieldingly spaced a definite distance apart by the spring $y3$ but are capable of being collapsed or pushed face-wise together, when a composed line is justified in a manner presently to be described. To permit the collapse of the spacers $y$ at such times, the individual patrices $x$ as may be observed, (Figs. 4, 25 and 26) also are formed with an upper and a lower pair of clearance apertures $x5$ and $x6$ extending transversely therethrough and which are sufficiently large to accommodate the head portions of the aligning pins $y4$ of the spacers as they are being collapsed.

The magazine A as indicated in dotted lines, Fig. 2, is supported in a vertical position in the machine frame in order to minimize as much as possible wear of the patrix characters that otherwise might result, and to break the fall of the patrices from the distributing mechanism to the escapements which are located as usual, near the lower or discharge end of the magazine, the latter (Fig. 17) is made in three sections including an upper and a lower vertical section A1 and A2 respectively, disposed in offset relation to each other, and an intermediate horizontal section A3 communicating with both the upper and lower sections. As thus constructed, patrices released by the distributor bar and entering the upper magazine section A1, may and usually would be arrested by preceding patrices already standing in said section, but in the absence of such patrices, those to follow would drop only the comparatively short distance from said bar to the horizontal section A3 of the magazine. From this point the patrices are pushed edgewise forwardly one after another through the horizontal magazine section into a position directly over the lower section A2 wherefrom they may continue their downward travel to the releasing position against the escapements.

The means employed to advance the patrices in this way through the horizontal section A3 of the magazine A, includes a series of reciprocating fore and aft slides B (Fig. 17), arranged directly behind said magazine section and mounted in the cross bar of a rockable bail-like member B1 supported through the medium of depending side arms B2, by a constantly driven horizontal shaft C. Actuation of the slides B is effected by a corresponding series of pivoted levers B3 rising from a rock shaft B4 and controlled by another bail member B5 which is secured at its opposite ends to the rock shaft and arranged between the side arms of the bail member B1. Operation of the rock shaft B4 is effected by an edge cam C1 keyed or otherwise secured to the shaft C and engaging an antifriction roller $b$ at the lower end of an arm B6 depending from the rock shaft B4. The cross bar of the bail member B5 is equipped with a series of pull springs B7 connected to the slide actuating levers B3 and adapted by rotation of the cam C1, to impart the active stroke to the slides B, whereas said cross bar, by its direct engagement with the actuating levers, serves to impart the return stroke to the slides. A coil spring $b5$ surrounding the rock shaft B4 and anchored to one of the depending side arms of the bail member B1, serves to hold the antifriction roller $b$ constantly engaged with the edge cam C1 so that the slide actuating unit may be sustained by said cam in the normal position shown in Fig. 17. The bail like member B1 and parts supported thereby are held securely in their normal position shown in Fig. 17, by a manually controlled locking pawl B8 which is mounted on a pivot screw $b2$ in a fixed bracket 12 of the machine frame, and engages a stud $b3$ projecting laterally from one side arm of said bail member.

In providing for the removal and replacement of the magazine A, it is further proposed according to the present invention to mount it so that it may be swung or rocked backwardly and forwardly from and to its normal upright position indicated in dotted lines, Fig. 2. To this end the magazine A (Fig. 17), is supported upon a third bail-like member D having a cross bar D1 which engages the underside of the intermediate horizontal section A3 of the magazine, and is formed with a pair of depending side arms D2 arranged adjacent those of the bail member B5 and also mounted on the horizontal shaft C. To locate the bail member D in its active position, at least one of the side arms D2 (Figs. 1 and 2) is formed with a lug or projection $d$ adapted at such time to engage a corresponding protuberance or banking stud 13 on the machine frame. As thus arranged the magazine together with its support is capable of being rocked rearwardly to a position (not shown) where the magazine may conveniently be removed and replaced when desired. In such instances however the bail member B1 and parts carried thereby including the reciprocating slides B, first must be released by disengaging the locking pawl B8 from the stud b3, and then swung downwardly out of the way.

Figure 4:
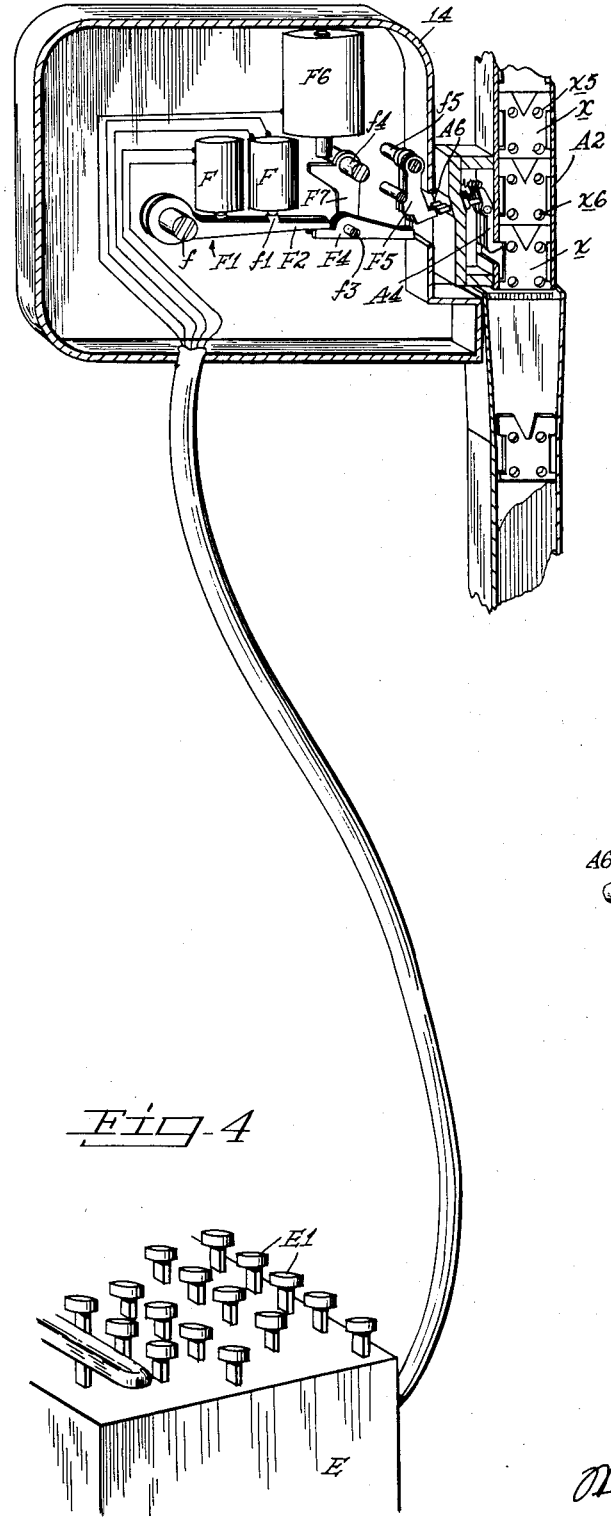
Fig. 4 is a perspective view partly in section and showing the electrically operated devices controlled from the keyboard, for actuating the patrix releasing escapements of the magazine.

As best shown in Figs. 4 and 4A, the patrix releasing escapements of the magazine A include respectively a single acting pawl A4 mounted on a pivot rod a, a pull spring A5 for holding the pawl normally in its active position and a plunger pin A6 for rocking the pawl against the tension of the spring A5 to its inactive position. Operation of the plunger pins A6, is effected electrically by devices controlled from the keyboard E, such devices as previously stated, including patrix selecting solenoids F (Figs. 9 and 10), arranged in pairs alongside the lower end portion of the magazine A and divided into groups of eight, one solenoid for each of a corresponding number of the patrix releasing escapements. The solenoids F control directly the operation of a series of levers F1 mounted on a common horizontal, pivot rod f, and the different pairs of solenoids in each group are disposed in the same vertical plane, two pairs above and two pairs below the axis of said pivot rod, so as to more easily perform their function and at the same time be supported in a housing 14 whose length will not exceed the width of the magazine at its discharge end.

In order to establish proper operative connections between the solenoids F and the levers F1 controlled thereby, said levers (Figs. 9 and 10), are formed with fore and aft as well as vertical arms F2, F3 respectively, all of which have offset projecting portions f1 terminating selectively in operative relation to the cores of the different solenoids. The arms F2 of the levers F1, extend directly rearward from the pivot rod f and are sufficiently long to engage from above the shorter arms of a series of rocking levers F4, the latter being divided into sets of eight, movable individually as separate units rearwardly, so that a pre-selected lever F4 of any set may actuate through the medium of one of a series of vertically disposed thrust elements F5, the plunger pin A6 of the corresponding magazine escapement. To be more explicit, when a solenoid F in any group is charged by the depression of a finger key of the keyboard E, the arm F2 of the lever it controls, will be forced downwardly so as to raise the rear end of the corresponding rocking lever F4 against the tension of a pull spring f2, into a position where it may engage and actuate the proper thrust element F5, as the set in which said rocking lever happens to be located, is moved rearwardly.

The rocking levers F4 in the different sets, are mounted on their own pivot rods f3 and are normally sustained in their horizontal position shown in Fig. 9, by the pull springs f2 so that with the exception of the one actuated in the manner above stated by the associated lever F1, they will clear the lower ends of the thrust elements F5 during their rearward movement. Such movement of the different sets of rocking levers F4 is controlled by separate solenoids F6, one for each group of the patrix selecting solenoids F, and disposed in operative relation to bellcrank levers F7 which are connected respectively to the pivot rods of 3 of the rocking levers. As best shown in Fig. 9, the bellcrank levers F7 as well as the thrust elements F5, depend from pivot rods f4, f5 respectively and are provided with individual pull springs f6, and f7 for holding them yieldingly against suitable banking stops f8 and f9 in their normal vertical positions.

Figure 3:
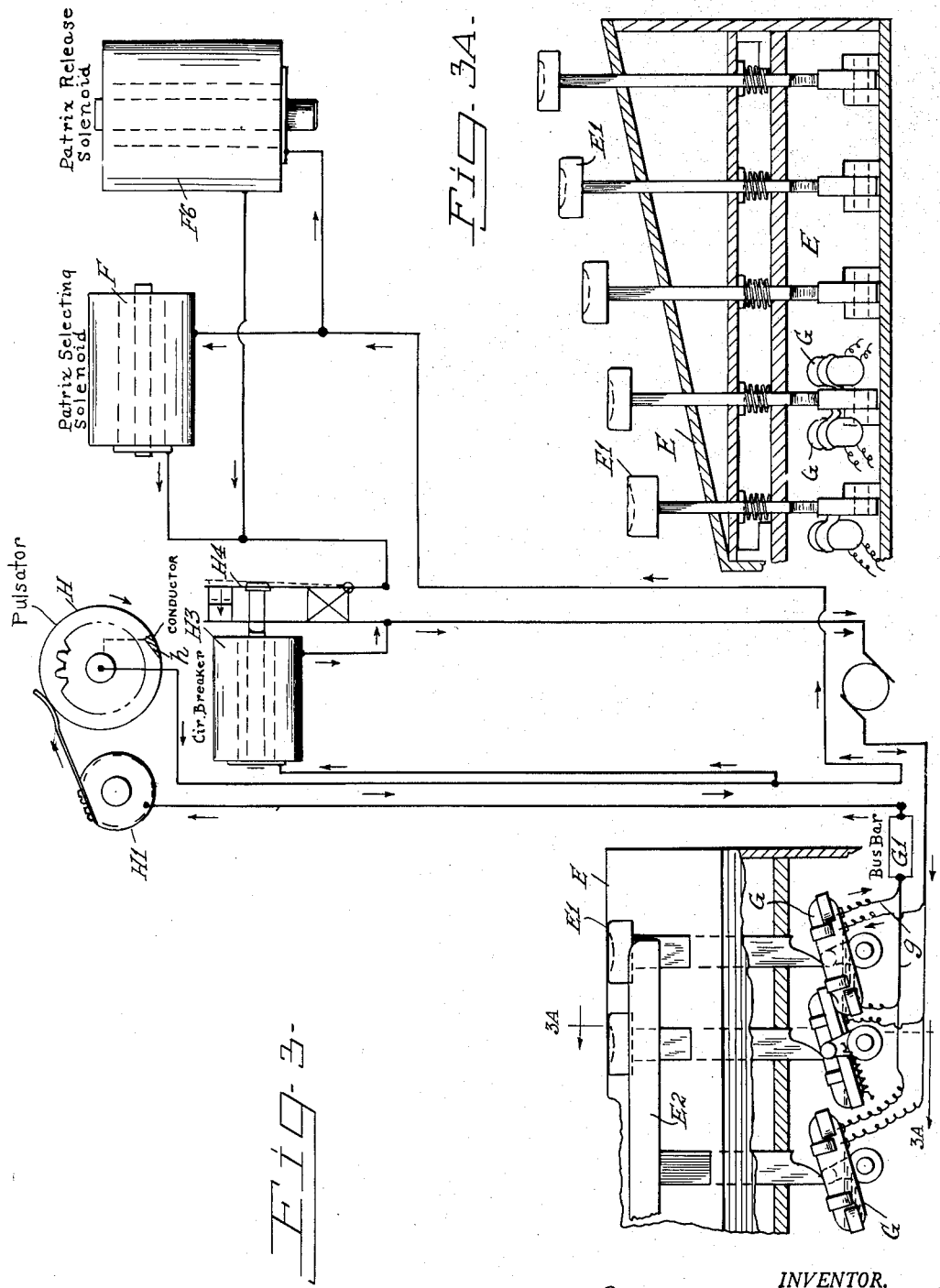
Fig. 3 is a diagrammatic view showing the devices through which an electrical circuit may be closed and broken by the actuation of a finger key of the keyboard, to cause the release of a patrix from the storage magazine.

The keyboard E (Figs. 3 and 3a) is equipped with the ordinary tiltable, mercury switches G which are operable by the depression of the respective finger keys E1 as well as the spacer key E2, and have terminal wires g leading to a common bus bar G1 wherefrom electrical circuits may be established through the solenoids F and F6 to first select and then effect the release of the patrices x and the spacers y for composition in line. In these circuits as shown diagrammatically in Fig. 3, there also is included a constantly rotating pulsator H provided with spaced apart conductor elements h, a shunt H1 associated therewith, and a circuit breaker H2 comprising a solenoid H3 and a normally closed switch H4 controlled thereby. The parts are so arranged that when a finger key is actuated in the customary way, a charge (indicated by the arrows Fig. 3) from the generator will pass through the bus bar G1, the shunt H1 and the pulsator H so as to energize all three solenoids H3, F and F6. However the operation of these solenoids is timed so that they may perform their particular functions in a predetermined order of succession i. e. the solenoid F first will condition certain parts in the manner previously described, for actuating the proper escapement pawl A4, then the solenoid F6 will effect the actuation of said pawl to cause the release of a patrix from the magazine A, and finally the solenoid H3 of the circuit breaker will open the switch H4 to break the circuit momentarily. On the other hand if a finger key E1 or the spacer key E2 should happen to be depressed too long, the circuit will remain broken until the key is released and in this way prevent the escape of possibly a whole column of patrices from the magazine. The pulsator of course, functions only to control the release of the patrices one at a time from the magazine under the normal operation of the finger keys.

Figure 12:
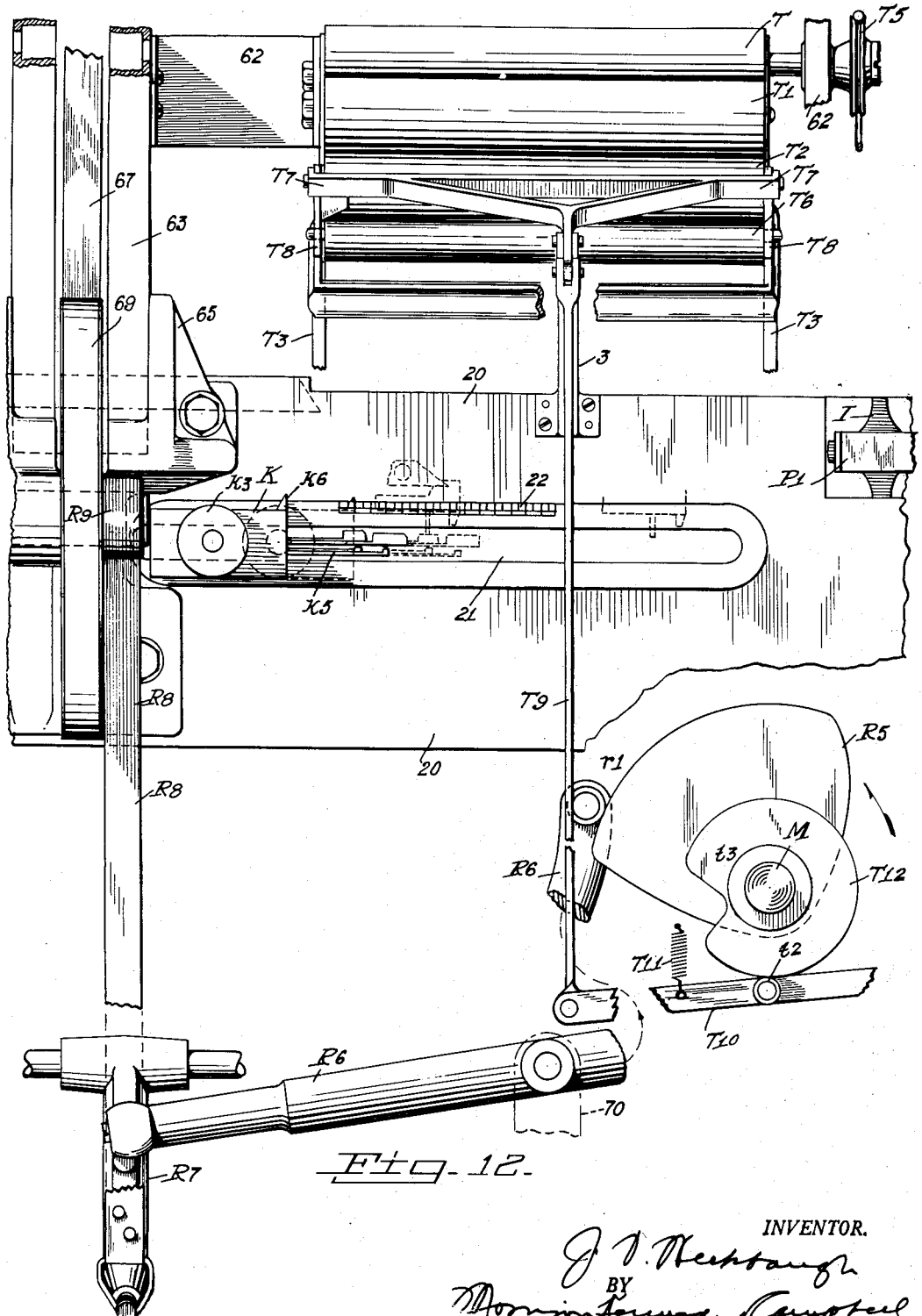
Fig. 12 is a front elevation showing the cam actuated lever and strap connections for operating the elevator, and showing also the spring actuated, cam controlled levers and linkage for moving the inking roller from and to its normal position.

Patrices x and spacers y released from the magazine A, pass downwardly through guide channels of an assembler front or raceway 15 and onto an inclined conveyor belt 16 which directs them to a horizontal receiving channel 17 located at the left of the keyboard E and wherein they are composed in line under the influence of a constantly rotating star wheel I against an upstanding finger J1 of a yielding slide block J. The front and rear side walls 18 and 19 of the channel 17 constitute part of an elongated bracket 20 (Figs. 1 and 5) of the machine frame, and are appropriately formed so as to support and guide the patrices and spacers by their projecting ears. After a patrix line is completely composed, it is shifted endwise by means later to be described, through the channel 17 away from the star wheel I into a position where it is properly justified preparatory to the inking and printing operations; and to locate and sustain the composed lines during these operations, the front side wall 18 of said channel is equipped with a stop device K (Figs. 12 and 22), which is arranged in a longitudinal slot 21 of said wall and is capable of adjustment therein according to the length of the lines to be composed. The stop device K (Fig. 22) includes an inner and an outer slide member k1 and k2 respectively, a knurled knob or handle k3 for clamping said device in its different adjusted positions and a stop element k4 pivotally attached between its ends to the inner slide member k1, so that it may be rocked to and from its function position. As best shown in Fig. 12, the stop device K also includes a pair of ordinary electric, leaf spring switches k5 operable consecutively to close electric circuits to a corresponding pair of light signals L1 and L2 (one red and the other green) conspicuously located and intended to inform the operator when composed lines advanced to the printing position, are too short to be properly justified. To facilitate the setting of the stop device K for lines of different lengths, the front face of the channel side wall 18 is provided with scale markings 22 arranged above the slot 21 and adapted to be read in conjunction with a pointer k6 carried by the outer slide member k2 of said device. Normally, the stop element k4 is located and sustained in its active position indicated in broken lines Fig. 5, by a lifter plate K1 arranged below the rear side wall of the bracket 20 and engaging an anti-friction roller k7 attached to one arm of the stop element. The lifter plate K1 (Fig. 5) is appropriately guided for a limited vertical movement by pin and slot connections k8 in the machine frame work and is operable during a machine cycle through the medium of two rocking levers K2 and K3, from an edge cam M1 mounted on the main cam shaft M.

The slide block J (Figs. 5 and 22), is mounted in horizontal guideways 23 located directly beneath the patrix receiving channel 17 of the frame bracket 20, and the upstanding line resistant finger J1 of said block preferably is hingedly connected thereto so that it may be swung downwardly and upwardly from and to its upright position. Normally however, or until after the justifying and printing operations have been consummated, the finger J1 will be sustained in its upright position by the engagement of an antifriction roller $j$ carried thereby, with the lower wall of one of the guide-ways 23. At one end, the slide block J is formed with a depending flange $j1$ presenting a nose portion $j2$ and an offset lug $j3$, the former being disposed in the path of the pivoted stop element $k4$ of the device K, and the latter constituting means whereby the slide block may be restored to its original position adjacent the star wheel I. The flange $j1$ also is provided with a stud or pin $j4$ projecting downwardly therefrom and adapted to actuate the leaf spring switches $k5$ already described, just before the slide block is arrested by the stop device K in locating a composed line in the printing position.

In the present machine (Figs. 7 and 7A), the star wheel I is attached to the front end of a fore and aft shaft I2 journaled in fixed spaced apart bearings 24 and driven constantly through the medium of a clutch, not shown, by suitable gearing such as a spur gear I3 pinned to the shaft I2, and a pinion I4 meshing therewith. The shaft I2 is capable of a limited endwise movement in order to displace the star wheel rearwardly preparatory to the shafting of a composed line to the printing position, and the means employed for this purpose includes generally, a lever N mounted on a vertical pivot stud $n$ rising from the fixed bracket 20, a reciprocable, horizontally disposed link N1 attached to the rear side of said bracket, and an intermediate, rockable cam segment N2 controlled by said link for actuating the lever N in opposition to a pull spring $n1$. Specifically, the lever N (Fig. 7), presents two diverging arms $n2$ and $n3$ of different lengths, the longer arm $n2$ being operatively connected at its free end to the shaft I2, and the shorter arm $n3$ being provided with an antifriction roller $n4$ engaging the cam segment N2. As best shown in Fig. 7A, the cam segment N2 is pivotally mounted on a stud $n5$ projecting laterally from the bracket 20, and is formed with a relatively short depending arm $n6$ (indicated in dotted lines) and engaging a beveled recess $n7$ formed in the upper edge of the horizontal link N1. The arrangement of the parts is such that when the link N1 is moved endwise in one direction, the cam segment N2 will be rocked clockwise according to Fig. 7A, and operate the lever N against the tension of the spring $n1$ so as to displace the star wheel I; and conversely when the link N1 is moved endwise in the opposite direction, the cam segment will be turned counterclockwise and permit the spring $n1$ to restore the lever N and the star wheel I to their original or normal positions.

Operation of the link N1 takes place in timed relation to other moving parts of the machine presently to be described, and is effected by means which include a hand lever O arranged conveniently adjacent the keyboard E and a vertically disposed, hinged rocker arm O1 which is controlled by the hand lever and connected to the contiguous end of said link.

The star wheel I in its normal position, is located as usual and as previously stated, in the path of the patrices $x$ and spacers $y$ in order that it may stack them in line against the upstanding finger of the slide block J as they pass from the assembler front or raceway 15 into the horizontal receiving channel 17. After the line is completely composed the star wheel I is retracted or displaced in the manner just described to permit the advance of the patrix line endwise through the channel 17 by the operation of a reciprocable pusher bar P (Figs. 5, 7 and 35), which is provided with front and rear side plates $p1$ and $p2$ respectively, extending longitudinally thereof and slidably mounted in the guideways 23 of the horizontal supporting bracket 20 before referred to. At its leading end the pusher bar P is equipped with a nose member P1 pivotally mounted thereon and sustained in its inactive position shown in Fig. 7 against the tension of a flat spring $p3$, by a rounded protuberance $i$ at the free end of the star wheel shaft I2. The side plates $p1$ and $p2$ of the pusher bar P (Fig. 7) extend somewhat beyond the following end thereof so as to accommodate between them an anti-friction roller $p4$, and adjacent said roller the bar P for reasons later to be pointed out, is provided with a depending projecting ear P2. The bar P (Figs. 5 and 7A), also carries a spring actuated, pawl shaped hook P3 pivotally attached to a bracket piece P4 and aligned horizontally with the offset lug $j3$ formed on the flange $j1$ of the slide block J already described. As best shown in Fig. 5, the bracket piece P4 is located below the leading end of the pusher bar P and is adapted through its engagement with a similar bracket piece 25 secured to the rear side wall of the elongated main bracket 20, to stop the pusher bar in its normal or retracted position. At such times the hook P3 is sustained out of action against the tension of its spring, by a set screw 26 mounted transversely in the bracket piece 25.

According to the present invention, the active stroke of the reciprocable pusher bar P takes place in two successive stages, the first, by operation of the hand lever O before the machine cycle is inaugurated, so as to positively advance a composed line to the printing position where it is arrested and justified under pressure of the bar P against the cam controlled stop element $k4$ of the device K; and the second, by a cam controlled, spring actuated lever arm Q rising from a fixed pivot rod 27 and adapted to function at the beginning of a machine cycle, to complete the active stroke of the pusher bar. This latter operation however, follows the automatic release of the slide block J by the movement of the cam controlled stop element $k4$ to its inactive position, and causes a patrix line regardless of its length, to be advanced through the receiving channel 17 into engagement with a horizontal ribbed bar R1 of an elevator R (see Figs. 8 and 20). The lever arm Q is controlled by an edge cam Q1 acting in opposition to a pull spring Q2 which is connected at one end to the arm Q and anchored at the other end to a suitable fixed bracket plate $q$. As best shown in Fig. 8, the cam Q2 engages a roller or follower $q1$ attached to the rear face of the lever arm Q and through such engagement will sustain the latter in its normal position against the tension of its spring until after the machine cycle has been inaugurated. At its upper end, the lever arm Q like the rocker arm O1, is also disposed in engaging relation to the roller $p4$ at the following end of the pusher bar P, and in order to insure smoothness in the operation of said bar as it starts the second stage of its active stroke, the shape of the edge cam Q1 is such as will permit the arm Q to slowly swing from its normal position (Fig. 5) into engagement with the roller $p4$ while the patrix line is still in the printing position.

It will be noted (Figs. 20 and 22) that the bottom wall of the rear guide way 23 for the pusher bar P and the slide block J, is cut away near the left hand end of the supporting bracket 20 and that two abutting, horizontally aligned rail sections 28 and 29 are substituted therefor. The rail section 28 is fastened to the rear side wall of the bracket 20 while the other rail section 29 at one end, is pivoted thereto and supported at its opposite end upon the top corner of a third rail section 30 which occupies an upwardly inclined position beneath the pivoted section 29, and is secured to the same side wall of the bracket 20. As the leading patrix of a composed line during the active stroke of the pusher bar P, engages the elevator bar R1, the slide block J (Fig. 20) will be arrested by a stop pin 31, and the sustaining roller for the upstanding finger J1 of said block, will have passed over and slightly beyond the fixed rail section 28 (indicated in dotted lines), in order to permit said finger to swing downwardly to a position out of the way beneath the patrix line. The pushed bar P then is allowed to complete its active stroke independently of the slide block J and as determined by a second stop pin 32, so that the last patrix of the composed line may be carried into engagement with the elevator bar R1. Incidental to this latter operation, the pawl shaped hook P3 at the leading end of the pusher bar P, is adapted to snap in behind the offset lug j3 of the slide block J preparatory to the return stroke of said bar.

The hand lever O (Figs. 1 and 5) is pivotally connected to the rocker arm O1 so that it may be swung downwardly and upwardly to and from the position indicated in dotted lines (Fig. 5), and between its ends it is provided with an antifriction roller $o$ arranged to engage bevel surfaces 33 and 34 standing at a definite inclination and formed respectively on a stationary piece 35 of a fixed angle-iron 36, and an upstanding finger 37 pivoted at its lower end in the machine framework. A pull spring 38 attached to the finger 37 and anchored to one end of the bracket 20, is adapted under normal operating conditions, to hold the finger 37 against a banking stud 39, with the bevel surface 34 thereof in flush alignment with the corresponding bevel surface 33. An ordinary electric switch 40 operable by the finger 37, and a leaf spring switch 41 located below the switch 40 and operable by a stud $o1$ projecting from the lower edge of the hand lever O, are arranged (see Fig. 6) in the same circuit so that they may control through means later to be described, the inauguration of a machine cycle of operation.

As best shown in Fig. 5, the rocker arm O1 rises from a pivot stud $o2$ in the stationary bracket 20 and at its upper end is formed with a head portion $o3$ disposed in engaging relation to the roller $p4$ before mentioned, which is located at the following end of the pusher bar P. A pull spring O2 attached to the rocker arm O1 at a point above the pivot stud $o2$ and anchored to the contiguous end wall of the bracket 20, serves to hold both the rocker arm and the hand lever O in their normal position shown in Fig. 5, such position as may be observed, being determined by the engagement of the antifriction roller $o$ on said lever, with a short vertical lug or protuberance at the upper end of the beveled stationary piece 35. During line composition, the pusher bar P also is held in its normal or retracted position against the bracket piece 25, by a pivoted latch or drag pawl S the latter being carried by the longer arm of a bell crank lever S1 and engaging from below, the depending projecting ear P2 of the pusher bar. As clearly shown in Fig. 5, the pawl S is held yieldingly in its active position against a stop pin $s$, by a relatively light pull spring $s1$ and is movable in opposition to said spring (Fig. 8), out of engagement with the depending ear P2 of the pusher bar, by means of a rockable lever S2 which is pivoted between its ends on the fixed bracket 20 with one arm disposed in engaging relation to the drag pawl S and the other arm connected by a pull spring $s2$ to the hand lever O. A pin and slot connection $s3$ limits the rocking movements of the lever S2, and the spring $s2$ has sufficient extensibility to permit the free operation of the hand lever O. The parts are so arranged that by the initial downward movement of the hand lever O, the lever S2 will be actuated to disengage the pawl S from the depending ear P2 of the pusher bar P so that the latter may be free to be operated by the continued downward movement of the hand lever in the manner and for the purpose already described.

The bell crank lever S1 (Figs. 7 and 8) is located adjacent the lever arm Q and mounted on the same pivot rod 27, but it is operable immediately after the pusher bar P completes its active stroke, to carry the drag pawl S into engagement with the depending ear P2 of the pusher bar. Such active movement of the lever S1 is effected in opposition to a pull spring S3 by an edge cam S4, the latter (Fig. 8) being mounted on the main shaft M and engaging a follower $s4$ on the shorter arm of said lever. The spring S3 is attached to the longer arm of the bell crank lever S1 and is sufficiently strong to effect the return stroke of the pusher bar under the control of the cam S4, and through the intervening connecting pawl S.

It will now be seen according to the construction and arrangement of certain parts already described, that as the hand lever O is swung downwardly and the roller $o$ thereon engages the fixed bevel surface 33, the drag pawl S first will be disengaged from the depending ear P2 of the pusher bar to free the latter, and the star wheel then will be retracted by operation of the lever N and link N1 to allow the nose member P1 of said bar to swing in behind a patrix line composed in the receiving channel 17. At this time the head portion $o3$ of the vertical rocker arm O1 will have been moved by operation of the hand lever O, into engagement with the antifriction roller at the following end of the pusher bar, so that as the downward movement of the hand lever is continued, and the roller $o$ carried over the bevel surface of the upright finger 37 onto the vertical surface thereof, the patrix line first will have been stopped in its advance, by the engagement of the slide block J with the pivoted stop element $k4$ of the device K, and then justified in the printing position preparatory to the closing of the lower electric switch 41 by the stud $o1$ of the hand lever, and the inauguration of the machine cycle of operation. If the composed line should happen to be too long to justify, the finger 37 will be forced away from its banking stud 39 in opposition to the spring 38, as the roller $o$ by the downward movement of the hand lever O, rides over the bevel surface 34, and thus will open the upper switch 40 to prevent the inauguration of the cycle. On the other hand, and in instances when a composed line advanced to the printing position, is too short to justify, the pin $j4$ of the slide block J, will actuate only the first leaf switch of the stop device $k$ and cause the illumination of the red warning signal L1 to exclusion of the green signal L2. When composed lines are of the proper justifying length, the green signal, except for a momentary flash of the red signal, will remain illuminated until the characters of the patrix lines have been inked and printed copies obtained therefrom by means yet to be described.

As the cycle continues, the pivoted stop element $k4$ of the adjustable device K, is actuated by the cam controlled lifter plate K1, to release the slide block J and thus permit the patrix line to be further advanced by the pusher bar P, into engagement with the elevator bar R1, this latter operation being effected as before stated, by the spring actuated lever arm Q under the control of the edge cam Q1. At this time the drag pawl S will have been carried again into engagement with the depending ear P2 of the pusher bar and the parts caused to assume their relative positions shown in Fig. 20, i. e. with the slide block J arrested by the stop pin 31, the pawl shaped hook P3 engaging the lug $j3$ on the flange of the slide block, and the finger J1 thereof sustained in its inactive position with the roller $j$ opposed to the fixed inclined rail section 30 on the rear side wall of the supporting bracket 20.

The pusher bar P now may start its return stroke under the influence of the spring S3 as the roller $s4$ of the bell crank lever S1 rides off the high portion of the edge cam S4. During this operation, the supporting roller $j$ for the line resistant finger J1 of the slide block J, first is carried into engagement with the inclined rail section 30 and then cammed upwardly thereby past the pivoted, switch-like rail section 29 and onto the lower wall of the horizontal guideway 23. As a result, the line resistant finger J1 is straightened up and again sustained in its upright position as the pusher bar P continues its return stroke. The hand lever O still should occupy its horizontal position in order that he head portion of the rocker arm O1, may be located in the path of the roller $p4$ at the following end of the pusher bar, and arrest the latter in opposition to the pull spring S3, in the position shown in Fig. 8 where the nose member P1 of said bar, is directly opposed to the protuberance *i* at the front end of the star wheel shaft I1. The hand lever O then may be raised, so as first, to release the star wheel retracting lever N through the intervening connections before described and permit said lever to restore the star wheel I to its functioning position; and immediately thereafter permit the spring S3 through the medium of the bell crank lever S1 and drag pawl S, to restore the pusher bar P to its normal position against the fixed bracket piece 25, where the hook P3 is caused to break its engagement with the slide block J by contact with the set screw 26. Coincident with the raising of the hand lever O, the small rocking lever S2, due to the relaxing of its actuating spring *s2*, will be ineffective and thus permit the drag pawl S as shown in Fig. 5, to retain its engagement with the depending ear P2 of the pusher bar P.

The machine cycle then continues until the composed line is carried by the elevator bar R to the distributing level, and shifted horizontally therefrom into a distributor box (not shown) wherein the patrices and spacers are separated from one another and fed to the main distributing mechanism for release according to character, above their appropriate magazine channels. In this way sufficient time is allowed before the cycle is completed, to carry on with the composition of the next patrix line, an advantage well understood by those familiar with type composing and casting machines.

Figure 6:
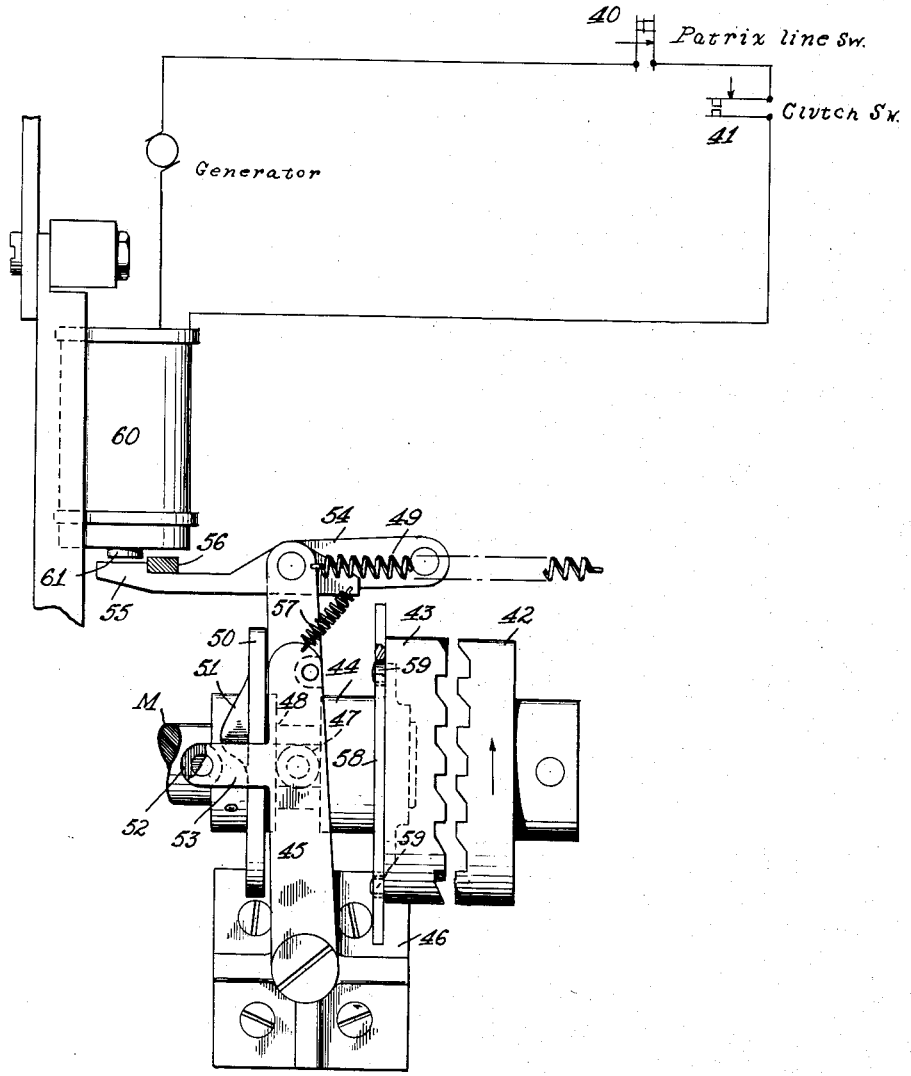
Fig. 6 is a side elevation of the main clutch and its control mechanism, and showing diagrammatically, the electrical circuit through which a machine cycle is automatically inaugurated.

The main clutch and the actuating devices therefore will now be described and as shown in Fig. 6, include two opposing clutch members 42 and 43 respectively, the former being pinned to a motor driven shaft (not shown), and the latter being formed on a sleeve 44 which is splined to the cam shaft M so that it may be moved axially thereon to effect the engagement and disengagement of the member 43 with and from the driving member 42. The axial movement of the sleeve 44 is accomplished by the operation of a vertically disposed, automatically controlled rocking lever 45 pivotally mounted at its lower end in a stationary bracket 46 and provided between its ends with an antifriction roller 47 (indicated in dotted lines) engaging an annular groove 48 formed in the sleeve. A pull spring 49 attached to the lever 45 is employed to effect the engagement of the clutch, and a face cam 50 arranged adjacent the sleeve 44 and secured to the cam shaft M, is employed to effect the disengagement of the clutch against the tension of said spring. The cam 50 presents a single high portion or shoe 51, and the lever 45 further is provided with a second antifriction roller 52 which is located in the path of the cam shoe and is attached to an arm 53 projecting laterally from said lever. To hold the clutch in its disengaged condition while the machine is at rest, the lever 45 at its upper extremity is equipped with a pawl 54 pivotally connected thereto and formed with a shouldered head portion 55 adapted at such times to engage from below, a fixed bracket piece 56. A comparatively light pull spring 57 attached to the other end of the pawl 54 and anchored to the lever 45, tends to swing the pawl upwardly and hold it yieldingly in its active position shown in Fig. 6.

The arrangement of the parts is such that by depressing slightly the free end or head portion of the pawl 54, in opposition to its spring, it will break its engagement with the bracket piece 56 and permit the spring 49 through the medium of the lever 45, to shift the sleeve 44 in the proper direction on the cam shaft M, to effect the engagement of the clutch member 43 with the driving member 42 and thus start the machine cycle. As a result of this operation the roller 52 will be carried into the path of the cam shoe 51 and the head portion of the pawl 54 will ride over the lower surface of the bracket piece 56 without passing out of engagement therewith. Thereafter, and as the cam shoe 51 by continued rotation of the shaft M, engages the roller 52, the sleeve 44 will be shifted against the tension of the spring 49, back to its original position so as to disengage the clutch when the cycle is completed, and at the same time cause the pawl 54 to regain its locking engagement with the bracket piece 56. In order to prevent overthrow of the cam shaft M as the clutch is disengaged at the end of a cycle, the assembly (Fig. 6) also includes a stationary disk 58 having a plurality of short concentric slots or apertures located at different distances from the axis of said shaft, and the clutch member 43 is provided with two or more pairs of studs 59 yieldably mounted therein and arranged to engage the apertures as said member breaks its engagement with the driving clutch member 42.

Operation of the pawl 54 in the manner just stated is effected by the charging of a solenoid 60 whose core element 61 terminates directly above the head portion 55 of said pawl. As shown diagrammatically in Fig. 6, the solenoid 60 is arranged in the same electrical circuit with the two switches 40 and 41 which are controlled by the operation of the hand lever O in the manner already described, so that when the hand lever is swung downwardly to advance and justify a composed patrix line in the printing position, it will close the circuit through the solenoid as it actuates the lower switch 41. As a result the pawl 54 will be disengaged from the bracket piece 56 by the thrust of the core element 61 and permit the engagement of the clutch by action of the spring 49 to inaugurate the machine cycle of operation. In this connection it may be mentioned that while the drawings do not show any method of temporarily stopping and restarting the operation of the machine during a cycle (as may be demanded for any one of the well known reasons), hand controlled means might readily be devised for actuating the lever 45 independently of the face cam 50 and at the same time prevent the engagement of the pawl 54 with the fixed bracket piece 56.

Reference again is directed to Figs. 1 and 12 and also to Fig. 21 which show respectively parts of the inking and printing devices and the actuating means therefor. The inking devices (Figs. 12 and 21), include a group of three ink supply rollers T, T1, T2 arranged one above the other in peripheral contact and rotatably mounted at their opposite ends in the side plates T3 of a suitable support T4 arranged between and secured to fixed bracket members 62 of the machine framework. A belt pulley T5 fastened to the shaft of the uppermost roller T of the group, turns the rollers at the speed required to transfer the ink to a vertically reciprocable inking roller T6 of smaller diameter, which normally is held against the lowermost roller T2 and properly guided in slots *t* formed in the side plates T3 of the support T4. The vertical movements of the inking roller T6 is effected by a fore and aft, Y-shaped rocking lever T7 (Figs. 12 and 21) connected at the rear by a pair of short links T8 to the trunnions of said roller, and pivotally mounted in a bracket 3 extending forwardly from the front wall of the elongated, horizontal bracket 20 before described. At its front end, the rocking lever T7 is operatively connected through the medium of a relatively long vertical link T9, to another rocking lever T10, the latter (Figs. 1 and 12) being disposed beneath the bracket 20 as well as the cam shaft M, and pivotally attached at its rear end to a stationary support 64. The lever T10 (Fig. 1) is actuated by a pull spring T11 and controlled by an edge cam T12 mounted on the cam shaft M and engaging a follower *t2* carried by said lever. Except for a deep recess *t3* in the outer edge of the cam T12, its radius is concentric with the cam shaft and normally occupies the angular position shown in Fig. 12 so that shortly after the machine cycle is inaugurated, one side wall of the recess *t3* by a partial rotation of the cam T12, will register with the follower *t2* and permit the spring T11 through the connections just described, to lower the inking roller T6 the distance required to transfer a coating of ink upon the characters *x4* of a justified patrix line. Then, as the other side wall of the recess t3 engages the follower t2, the inking roller T6 will be restored through the same connections to its original position against the lowermost roller T2 where it is sustained against the tension of the spring T11 by the cam T12 until the machine cycle is completed.

Immediatly after the inking operation has been consummated, an impression cylinder U is advanced momentarily from the rear to print the line of type from, the patrix characters upon a paper sheet or other suitable material u stretched over the cylinder U. As best shown in Fig. 21, the impression cylinder U also is provided with trunnions u1 and is sustained and guided in its bodily movements through the engagement of the trunnions with corresponding fore and aft slots t4 formed in the opposing side plates of the fixed support T4 already described. Such movements of the cylinder U, are effected by the operation of a rock shaft U1 mounted in the fixed support T4 and provided at its opposite ends with a pair of vertical arms U2 appropriately connected respectively to the trunnions u1 of the cylinder. The rear end walls of the slots t4 serve to locate the cylinder in its normal position shown in Fig. 21 where it is held yieldingly by a pull spring U3 which is connected to one of the vertical arms U2 of the rock shaft U1, and is anchored at some convenient point in the machine frame.

Rotation of the rock shaft U1 is controlled by a face cam U4 mounted on the cam shaft M, and formed with a single high portion u2 as well as with a concentric low portion u3, the latter when the machine is at rest, being directly opposed to an antifriction roller or follower u4 attached to the lower end of a crank arm U5 depending from the rock shaft U1. Therefore, at the proper moment during a machine cycle and as the high portion u2 of the cam U4 engages the follower u4, the rock shaft U1 will be turned in the proper direction to move the cylinder U forwardly in opposition to the pull spring U3, against the characters of a composed patrix line. Then as the high portion u2 of the cam U4 passes out of engagement with the follower u4, the spring U3 will be allowed to act to move the cylinder backwardly under control of the cam U4 until it is stopped in its normal position by the engagement of the trunnions u1 with the rear end walls of the slots t4.

There remains to be described, the distributor shifter devices and the means whereby the elevator R during a machine cycle, first is lowered to receive a patrix line delivered thereto in the manner before described, and then raised to carry the line to the distributing level. As best shown in Figs. 13 and 18, the elevator R is arranged directly behind a hollow, sheet metal guide post 63 and includes in addition to the ribbed bar R1, a body portion R2, an arm R3 projecting rearwardly therefrom, and a horizontal plate R4 pivotally connected to the free end of said arm and whereto the bar R1 is affixed. The guide post 63 in cross section, is rectangular in shape and is supported at its upper and lower ends, by suitable brackets 64 and 65 bolted respectively to the distributor beam 6 and the elongated stationary bracket 29 hereinbefore described. In the improved machine, the elevator R is slidably engaged with the rear wall of the guide post 63 so that it may be lowered and raised for the purpose stated, the downward movement of the elevator being effected by an edge cam R5 through certain connections about to be described, and its upward movement for reasons of safety unnecessary to mention, being effected by a weight 66 under the control of the cam R5. The weight 66 is concealed within the guide post 63 and is suspended from one end of a band or strap 67 which is looped over a pulley 68 and anchored at its other end to the outer edge or periphery of a much larger pulley 69. The two pulleys 68 and 69 are pinned to separate shafts 68a and 69a journaled respectively in the upper and lower brackets 64 and 65, and at a predetermined point between the pulleys, the elevator R is attached to the strap 67 so that it may be carried by rotation of the larger pulley in opposite directions, the distance required to locate it at either the distributing level or at the patrix line receiving level.

The cam R5 (Figs. 12 and 13) is keyed or otherwise secured to the cam shaft M, and is positioned thereon so as to engage a roller or follower r1 located at one end of a rocking lever R6 which is pivotally mounted in a stand bracket 70 (Fig. 1) and at its opposite end acts upon a lever R7 hingedly mounted in the framework on an axis disposed at right angles to that of the lever R6. At its free end, the lever R7 (Fig. 13) is operatively connected by means of a strap R8 to a relatively small pulley R9 located immediately adjacent the pulley 69 and secured to the same shaft 69a. The parts are so arranged that at the proper moment during a machine cycle, the rocking lever R6 will be actuated by the cam R5 so as to depress the hinged lever R7 and through the strap connection of the latter with the pulley R9, rotate the larger pulley 69 in the proper direction to pull the elevator R downwardly against the influence of the weight 66 until the horizontal plate R4 of the elevator banks upon the side walls of the patrix receiving and line transfer channel 17. Then, after a patrix line has been advanced by the pusher bar P into engagement with the elevator bar R1, and as the low portion of the cam R5 is brought to bear upon the roller r1, the weight 66 is allowed to function through the strap 67 to raise the elevator R to the distributing level where the patrix line is shifted horizontally therefrom into a position for final distribution.

This later operation takes place near the completion of a machine cycle and is accomplished by a reciprocable shifter slide V (Figs. 1, 14, 15 and 16) which is equipped in the well known way, with an upstanding, offset line engaging finger V1 and mounted in retaining guideways V2 of a horizontal supporting bar V3. In the present machine however, the active or line shifting stroke of the slide V is effected by a weight 71, and the inactive stroke thereof is effected by a lever V4 acting in opposition to the weight and pivotally mounted at one end in a fixed bracket 72. The lever V4 (Fig. 16) is operated by a cam element V5 mounted on the cam shaft M and arranged to engage a follower v carried by said lever. Like the weight employed to raise the elevator R, the weight 71 is suspended from a band or strap 73 looped over a pulley 74 and anchored to the peripheral edge of a considerably larger pulley 75. The two pulleys 74 and 75 are mounted on individual pivot studs v1 and v2 projecting forwardly from separate bracket members V6 and V7 which depend from the opposite ends of the horizontal supporting bar V3, said pulleys being so arranged in relation to each other that the stretch of the strap 73 between them is parallel with the guide-ways V2 and close to the lower edge of the supporting bar. At its leading end, the shifter slide V is connected by means of a bracket piece V8 to the horizontal portion of the strap 73, and at the end of its active stroke the slide is stopped in a position (Fig. 14) close to the smaller pulley 74.

The larger pulley 75, as best shown in Fig. 15, is operatively connected to the free end of the lever V4 by a separate strap 76 which is anchored to a small pulley 75a integrally attached to the pulley 75 and journaled on the same pivot stud v2. As the lever V4 is actuated by the cam element V5, the large pulley 75 will be turned counterclockwise against the influence of the weight 71 and thus retract the shifter slide V just before the elevator R during its upward movement is arrested at the distributing level. Then, and as the high portion of the cam element V5 passes out of engagement with the follower v on the lever V4 (Fig. 16), the weight 71 is allowed to function and through its connection with the slide V imparts the active stroke thereto. As a result a patrix line supported by the elevator R will be shifted horizontally therefrom into a position from which the patrices and spacers may be fed by devices not shown, to the main distributing mechanism for release according to character above their proper magazine channels.

Occasions frequently arise when it is necessary to manually retract the shifter slide and finger from their normal position in order that patrices may be pushed onto the elevator bar and then shifted therefrom by the finger in the manner and for the purpose just described, when the slide is released. To facilitate this operation on the improved machine, the supporting bar V3 for the shifter slide V, is mounted at one end on a hinge pin v3 in a stationary bracket 77, and sustained in its horizontal position by an arm 78 which rises from a rock shaft 79 and engages a lug V10 depending from the other end of the bar V3. The rock shaft 79 is mounted in the contiguous upright side member 4 of the machine frame and provided with a crank handle 80 operable at will to turn the rock shaft through a limited number of degrees in opposite directions. When the crank handle is swung downwardly (say through 45°) from its normal position (Fig. 14) the arm 78 by a corresponding turn of the rock shaft 79, will be swung from beneath the lug V10 and allow the supporting bar V3 to assume the inclined or tilted position indicated in broken lines where the shifter slide finger V1 may be pulled in opposition to the weight 71 along the guide-ways V2 and out of the path of patrices as they are pushed onto the elevator bar R1. Thereafter and as the crank handle is swung upwardly the supporting bar V3 is restored to and sustained in its normal horizontal position by means of the arm 78 of the rock shaft, and the finger V1 is released so that it might function in the manner already described.

In conclusion, it may be stated that while the general principles involved in the handling of the patrices in the improved machine from the time of assemblage until they are distributed, follow closely those employed in the handling of matrices in the commercial Linotype machines, the justification of the composed patrix lines, is effected automatically by the line delivery means as the lines are arrested in the printing position, and the product of the present machine, is a printed sheet of paper or other suitable material of a desired length and width, which is adapted for subsequent use in connection with lithographic offset and intaglio printing. Therefore, the complicated justification, slug casting and ejecting mechanisms as well as safety devices associated therewith, are not required so that the machine herein described, its construction and mode of operation, is comparatively simple and presents many advantages which readily will be recognized by those familiar with the printing art.

Having thus described the invention, what I desire to secure by Letters Patent of the United States, is set forth in the following claims.

What I claim is:

1. In a patrix line composing and printing machine equipped with assembling devices and including in combination, an elongated receiving channel wherein the patrices together with collapsible spacers, are assembled in line under the influence of said devices, a stop for locating the composed line in the printing position, unitary means operable to advance the composed line in said channel until it is arrested by the stop, and also to effect justification of the patrix line by collapsing the spacers therein preparatory to the printing operation, means dependent upon the proper justification of the line to inaugurate the machine cycle of operation.

2. A combination according to claim 1, wherein the unitary means include a reciprocable pusher bar arranged to engage the following end of the composed line, and the assembling devices include a constantly rotating star wheel movable axially from its active position to permit the operation of said bar, and driving means maintaining driving connection with the star wheel in either its active or inactive position.

3. A combination according to claim 2, including manually controlled means for effecting first the axial movement of the star wheel then the active stroke of the pusher bar.

4. In a patrix line composing and printing machine equipped with assembling devices and including in combination, an elongated receiving channel wherein the patrices together with collapsible spacers are assembled in line under the influence of said devices, a reciprocable pusher bar mounted in suitable guide ways located immediately below the receiving channel and operable to advance the composed line in said channel to the printing position, a constantly rotating star wheel associated with the assembling devices and movable axially from its active position to permit the operation of the pusher bar, and a cam actuated manually controlled lever for effecting first the axial movements of the star wheel and then the active stroke of the pusher bar.

5. A combination according to claim 4, wherein the pusher bar is provided with a spring actuated nose portion movable laterally into and out of engaging relation with the following end of the composed line and controlled by the axial movements of the star wheel.

6. In a patrix line composing and printing machine equipped with assembling devices and a receiving channel wherein the patrices are composed in line under the influence of said devices, the combination of a yieldable slide block, a line resistant finger carried thereby, a pusher bar operable to advance the composed line and justify it in the printing position, a stop device capable of manual adjustment according to the length of the lines to be composed, for arresting and sustaining the slide block in different operative positions for the justifying and printing operations, and manually controlled means for operating the pusher bar until the line is arrested by the stop in any of its adjusted positions.

7. A combination according to claim 6, including a normally open switch arranged in an electric circuit to the main clutch, and wherein the manually controlled means includes a hand lever operable to close said switch immediately after the justification of the composed line has been effected and thus start the machine cycle of operation.

8. A combination according to claim 6, wherein the stop device includes a stop element movable to and from active position, and including means operable during a machine cycle to move said element to its inactive position in any position of adjustment of the stop device so as to automatically release the slide block immediately after the printing operation has been effected.

9. In a patrix line composing and printing machine equipped with assembling devices and a receiving channel wherein the patrices are composed in line under the influence of said devices, the combination of a horizontal, reciprocable pusher bar, manually controlled means for operating said bar to advance the composed line to, and justify it in the printing position, means controlled by said manual means for inaugurating the machine cycle of operation after justification of the line, an elevator movable upwardly and downwardly during a machine cycle for transporting the line from the composing level to the distributing level, means for operating the elevator, and automatically controlled means for also operating the pusher bar to advance the composed line from the printing position onto the elevator.

10. A combination according to claim 9, wherein the elevator includes a ribbed bar for supporting the patrices by their tooth combinations, and including a slide block, a line resistant finger pivotally connected thereto, means for supporting said finger independently of the slide block in its normal upright position during the line composing, justifying and printing operations, and means supplementing said supporting means whereby the finger is permitted to be rocked downwardly out of the way by the leading patrix of the line as the latter is advanced into engagement with the elevator bar.

11. A combination according to claim 9, including spring actuated, cam controlled means operable during the cycle, for restoring the pusher bar to its normal position, and means carried by said bar for restoring the slide block to its normal position.

12. A combination according to claim 10, wherein the pusher bar is slidably mounted in horizontal guideways, and the slide block is mounted in the same guideways, and wherein the lower wall of one guide-way serves to support the line resistant finger in its upright position, said wall being cut away at the end adjacent the ribbed bar to permit the downward rocking of the line resistant finger.

13. A combination according to claim 8, wherein the means for moving the stop element of the adjustable device to its inactive position, includes a cam controlled vertically movable plate of the proper length to perform its function in any adjusted position of said device.

14. A combination according to claim 6, including two differently colored light signals, and a pair of ordinary leaf switches carried by the stop device and controlled by the slide block, for causing the illumination of one signal or the other, whereby the operator may be informed when patrix lines are composed to the proper length or when they may be too short to justify.

15. In a patrix line composing and printing machine equipped with assembling and distributing mechanisms, the combination of a magazine comprising an upper storage section and a lower storage section disposed in offset relation to each other and a shorter intermediate storage section through which the patrices pass from the upper to the lower section, a series of escapement pawls located near the discharge end of the lower magazine section whereby patrices may be released for assemblage in line, and automatically controlled means for shifting the patrices edgewise from the upper magazine section through the intermediate section and into a position where they may pass downwardly through the lower magazine section until finally arrested by the escapement pawls.

16. A combination according to claim 15, wherein said means include a series of reciprocating slides arranged to engage patrices supported at the entrance to the intermediate magazine section, a constantly rotating cam, and connections controlled by said cam for operating the slides.

17. A combination according to claim 16, wherein the connections between the cam and slides include a corresponding series of spring actuated levers operatively connected to the slides, and a rocking yoke member operable directly by the cam and controlling the operation of said levers.

18. A combination according to claim 1 wherein the spacers comprise respectively two opposed members, a spring interposed between said members to hold them yieldingly spaced apart, and studs projecting laterally from one member through apertures formed transversely in the other member to keep them in proper facewise alignment, and wherein the patrices are formed with corresponding apertures to accommodate the studs during the line justifying operation.

19. In a patrix line composing and printing machine, the combination of a magazine, patrix releasing escapements therefor, electrically controlled devices for actuating the escapements directly, said devices including a series of levers mounted on a common pivot rod and divided into groups, corresponding groups of solenoids for operating the levers to condition the devices for the release of any selected patrix, and a separate, higher potential solenoid associated with those in each group for effecting the actuation of the proper escapement.

20. A combination according to claim 19, including a series of pivoted, spring controlled thrust elements for actuating the escapements directly, and wherein said devices also include sets of rocking levers mounted on different pivot rods and movable by the solenoid controlled levers into engaging relation to the thrust elements, and means controlled by the higher potential solenoids for moving the different sets of rocking levers endwise to actuate the thrust elements.

21. A combination according to claim 20, wherein said means include bell crank levers connected respectively to the pivot rods of the different sets of rocking levers and operable directly by the higher potential solenoids.

22. A combination according to claim 20, wherein the escapements include spring controlled pawls and plunger pins directly opposed to the thrust elements, for actuating the pawls.

23. In a patrix line composing and printing machine, the combination of a magazine, patrix releasing escapements therefor, electrically controlled devices for actuating the escapements directly, a keyboard equipped with tiltable mercury switches operable by the depression of the finger keys to close individual electrical circuits through said devices, and timing means arranged in such circuits to control the release of patrices from the respective magazine channels, in a predetermined order of succession.

24. A combination according to claim 23, wherein the electrically controlled devices include automatically controlled means for breaking a circuit if the corresponding finger key should be held depressed too long.

25. In a patrix line composing and printing machine, the combination of a magazine, a series of patrix releasing escapements therefor, a corresponding series of patrix selecting solenoids, said solenoids being divided into a plurality of groups, and a group of escapement actuating solenoids, one for each group of patrix selecting solenoids, and means for energizing any one of the patrix selecting solenoids and any one of the escapement actuating solenoids in effecting the release of a patrix from the magazine.

26. A combination according to claim 25 including timing means in the solenoid circuits to delay the actuation of the patrix releasing escapement.

27. In a patrix line composing and printing machine equipped with assembling devices and distributing mechanism, the combination of a magazine, an elevator for transporting a composed line after the printing operation, to the distributing level, a retractible slide associated with the distributing mechanism and operable to shift the patrices and spacers of the composed line from the elevator preparatory to final distribution into their appropriate magazine channels, a support formed with longitudinal guideways to accommodate the retractible slide, said support being pivotally mounted at one end in the machine so that it may be swung to and from its normal position, and means operable at will to effect such movements of the support.

28. A combination according to claim 27 wherein said means include a pivoted cam element arranged to engage from below the other end of the slide support, and a hand lever for turning the cam element through a given number of degrees in opposite directions.

29. In or for a patrix line composing and printing machine equipped with assembling and distributing mechanism, a channeled magazine wherein the patrices are stored according to character, said magazine comprising an upper storage section and a lower storage section disposed in offset relation to each other, and a shorter intermediate magazine section through which the patrices pass from the upper to the lower section, said lower section being provided with means at its discharge end for retaining the patrices therein after their passage thereto from the upper section.

30. In or for a patrix line composing and printing machine equipped with assembling and distributing mechanism, a channeled magazine wherein the patrices are stored according to character, said magazine comprising an upper storage section and a lower storage section disposed in offset relation to each other, and a shorter intermediate magazine section through which the patrices pass from the upper to the lower section, said lower section at its discharge end being provided with a series of escapement pawls for controlling the release of the patrices stored therein.

31. In a typographical composing machine, the combination of a storage magazine provided with a series of escapements for the release of typographical elements, a corresponding series of electrically actuated elements for operating the escapements directly, electric circuits for the electrically actuated elements, selectively controlled switches for closing the electric circuits, and timing elements in the electric circuits to delay the operation of the escapements after the closing of the electric circuits.

References Cited in the file of this patent

UNITED STATES PATENTS

| | | |
|---|---|---|
| 657,042 | St. John | Aug. 28, 1900 |
| 821,885 | Ray | May 29, 1906 |
| 868,826 | Wales | Oct. 22, 1907 |
| 925,073 | Bancroft | June 15, 1909 |
| 1,050,495 | Smith | Jan. 14, 1913 |
| 1,321,329 | Polley et al. | Nov. 11, 1919 |
| 1,495,014 | Galloway | May 20, 1924 |
| 1,595,076 | Damm | Aug. 10, 1926 |
| 2,035,214 | Bailey | Mar. 24, 1936 |
| 2,065,274 | Good | Dec. 22, 1936 |
| 2,152,752 | Spaeth | Apr. 2, 1939 |
| 2,165,429 | Weber | July 11, 1939 |
| 2,312,330 | Freeman et al. | Mar. 2, 1943 |

FOREIGN PATENTS

| | | |
|---|---|---|
| 489,143 | Great Britain | July 20, 1938 |